United States Patent
Mayumi et al.

(10) Patent No.: US 9,613,540 B2
(45) Date of Patent: Apr. 4, 2017

(54) EXAMINATION SUPPORT APPARATUS, AND EXAMINATION SUPPORT METHOD

(71) Applicant: FUJITSU LIMITED, Kawasaki-shi, Kanagawa (JP)

(72) Inventors: Hidehiko Mayumi, Kawasaki (JP); Toshio Tanaka, Yokohama (JP); Takeaki Kobayashi, Yokohama (JP); Masahiro Kawasaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 388 days.

(21) Appl. No.: 14/026,030

(22) Filed: Sep. 13, 2013

(65) Prior Publication Data

US 2014/0017655 A1 Jan. 16, 2014

Related U.S. Application Data

(63) Continuation of application No. PCT/JP2011/056316, filed on Mar. 16, 2011.

(51) Int. Cl.
*G09B 3/00* (2006.01)
*G09B 7/00* (2006.01)
(Continued)

(52) U.S. Cl.
CPC ............. *G09B 7/06* (2013.01); *G06Q 10/10* (2013.01); *G09B 7/02* (2013.01); *G09B 7/04* (2013.01); *G09B 7/08* (2013.01)

(58) Field of Classification Search
USPC .................. 434/322, 323, 350, 365
See application file for complete search history.

(56) References Cited

U.S. PATENT DOCUMENTS

2007/0009864 A1   1/2007  Rikimaru et al.

FOREIGN PATENT DOCUMENTS

JP     7-334069      12/1995
JP     2000-147991    5/2000
(Continued)

OTHER PUBLICATIONS

International Preliminary Report on Patentability mailed Sep. 17, 2013 in corresponding International Application PCT/JP2011/056316.
(Continued)

*Primary Examiner* — Kesha Frisby
(74) *Attorney, Agent, or Firm* — Staas & Halsey LLP

(57) ABSTRACT

The examination support apparatus includes a question database, an answer status database, a question output unit, an answer acquisition unit, a correct/incorrect determination unit, a calculation unit, and a determination unit. The question output unit extracts and outputs examination questions from the question database. The answer acquisition unit acquires an answer to each of the above-described examination questions transmitted from an examinee terminal, and the correct/incorrect determination unit determines whether the answer is correct or incorrect. The calculation unit calculates for the examinee a correct-answer percentage to the examination questions in the same administering section based on a result of the correct/incorrect determination. The determination unit calculates a change in a correct-answer percentage for the examinee from the correct-answer percentage of the examination questions in the particular administering section stored in the answer status database and the correct-answer percentage calculated, and determines the change.

18 Claims, 26 Drawing Sheets

(51) Int. Cl.
*G09B 7/06* (2006.01)
*G09B 7/02* (2006.01)
*G09B 7/04* (2006.01)
*G09B 7/08* (2006.01)
*G06Q 10/10* (2012.01)

(56) References Cited

FOREIGN PATENT DOCUMENTS

| | | |
|---|---|---|
| JP | 2000-222527 | 8/2000 |
| JP | 2002-91282 | 3/2002 |
| JP | 2005-55550 | 3/2005 |
| JP | 2007-17572 | 1/2007 |
| JP | 2007-248773 | 9/2007 |
| KR | 2002-0023519 | 3/2002 |
| KR | 10-2010-0123209 | 11/2010 |
| WO | WO 03/050782 A1 | 6/2003 |

OTHER PUBLICATIONS

Korean Office Action dated Jan. 19, 2015 in corresponding Korean Patent Application No. 10-2013-7026593.
International Search Report mailed Apr. 19, 2011 in corresponding International Application No. PCT/JP2011/056316.
Korean Office Action dated Sep. 18, 2015 in corresponding Korean Patent Application No. 10-2013-7026593.
"How ETS, which administers and scores TOEIC tests, investigates a test taker who earned a remarkably high score as compared to the previous test result?", Naver's Knowledge in Expert Answers, posted on Feb. 4, 2008, Retrieved from the Internet on Sep. 18, 2015, <http://kin.naver.com>, 5 pp.

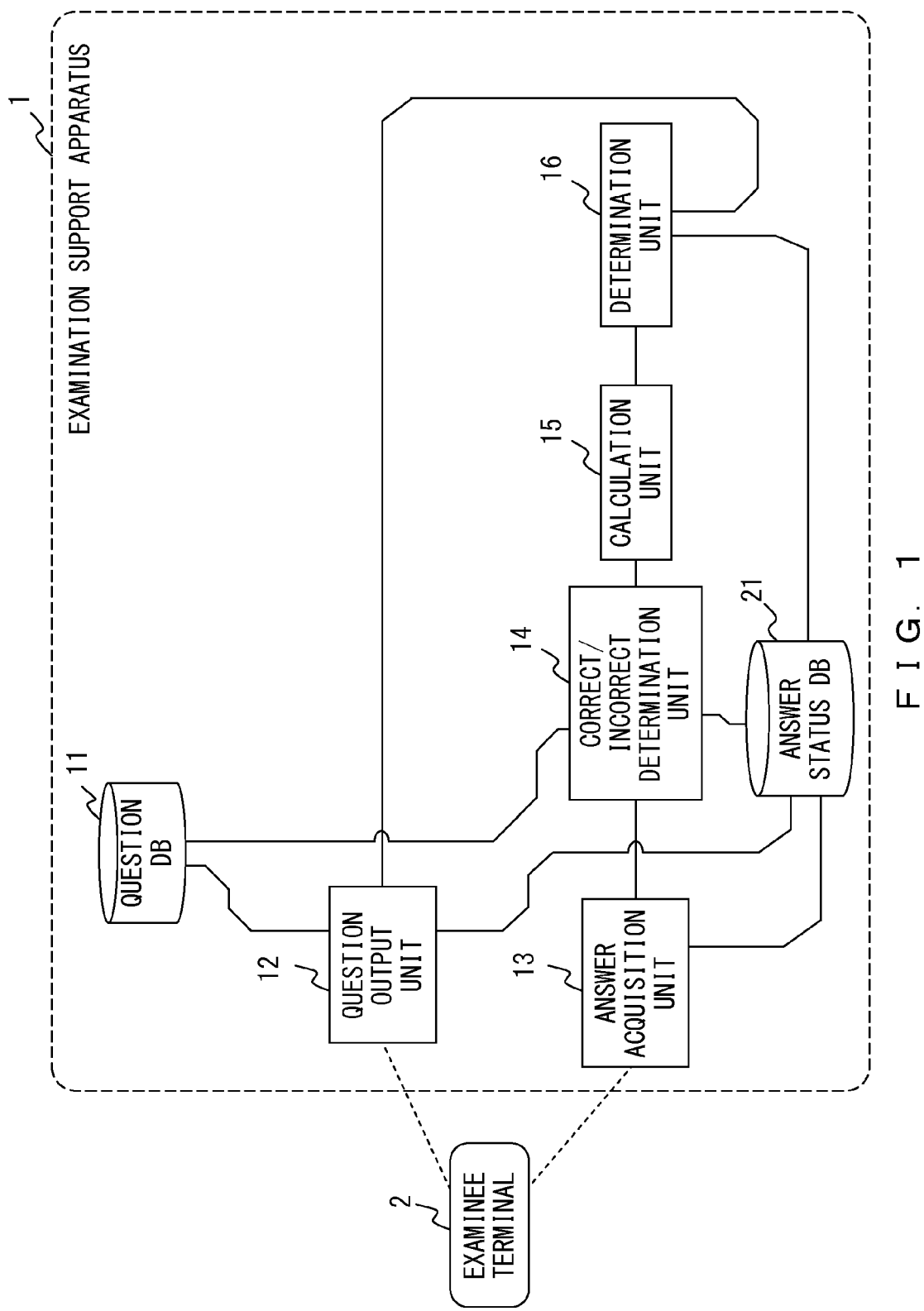
F I G. 1

STUDENT DB 52

| STUDENT ID | PASSWORD | STUDENT NAME |
|---|---|---|
| 201001001 | sjhgpeut87 | TARO AOKI |
| 201001002 | Kuu862nkk | JIRO AOSHIMA |
| 201001003 | 984nfkihb | SABURO AOTA |
| 201001004 | k3754h5nkl | ICHIRO AOYAMA |

FIG. 4A

DRILL DB 53

| CATEGORY | DRILL ID | QUESTION ID | QUESTION | CHOICE 1 | CHOICE 2 | CHOICE 3 | CHOICE 4 | CORRECT ANSWER |
|---|---|---|---|---|---|---|---|---|
| HISTORY (Kamakura Period) | H-kamakura-1 | Hk102 | What was the political system set up by the Hojo clan? | Consulate | Legislation | Surgeon | Regency | 1 |
| | | Hk103 | What was the law for warrior government established by the Kamakura Shogunate? | Legal code | Warrior code | Hojo established law | Legal Code for Warrior Class | 4 |
| | | Hk104 | What was the battle started in 1201? | Genko War | The Onin War | Kennin War | Jokyu Disturbance | 3 |
| | | ... | ... | ... | ... | ... | ... | ... |
| | H-kamakura-4 | Hk401 | What year of the Western calendar the Kamakura Shogunate was established? | 1182 | 1192 | 1197 | 1199 | 2 |
| | | Hk402 | Who established the Kamakura Shogunate? | Minamoto-no-Yoshitsune | Minamoto-no-sadaie | Minamoto-no-yoshitomo | Minamoto-no-yoritomo | 4 |
| | | Hk403 | What was the name of the place to take complaints established by the Kamakura Shogunate? | Court | Complaint office | Board of Inquiry | Order Office | 3 |
| | | Hk404 | What was the war initiated by the ex-emperor Go-Toba to put down the Kamakura Shogunate? | Onin War | Battle of Sekigahara | Go-toba's Rebellion | Jokyu Disturbance | 4 |

F I G. 4 B

DRILL START TIME TABLE 54
| DRILL START TIME | |
|---|---|
| YEAR-MONTH-DAY | START TIME |
| 2010/1/31 | 10:00:05 |
F I G. 4 C

| STUDENT ID | CATEGORY | DRILL ID | DRILL ADMINISTERING DATE AND TIME | QUESTION ID | ANSWER | CORRECT/ INCORRECT | ANSWERING TIME (m) |
|---|---|---|---|---|---|---|---|
| 201001001 | HISTORY (Kamakura Period) | H-kamakura-4 | 2010/10/29 10:00:04 | Hk401 | 2 | ○ | 1 |
| | | | | Hk402 | 4 | ○ | 2 |
| | | | | Hk403 | 3 | ○ | 1 |
| | | | | Hk404 | 4 | ○ | 2 |
| | | H-kamakura-1 | 2010/10/14 10:00:00 | Hk101 | 2 | ○ | 1 |
| | | | | Hk102 | 4 | × | 2 |
| | | | | Hk103 | 1 | × | 1 |
| | | | | Hk104 | 1 | × | 2 |
| | | H-kamakura-2 | 2010/10/5 10:00:10 | Hk201 | 3 | × | 4 |
| | | | | Hk202 | 4 | × | 6 |
| | | | | Hk203 | 1 | × | 1 |
| | | | | Hk204 | 2 | ○ | 1 |
| | | H-kamakura-3 | 2010/10/22 10:00:06 | Hk301 | 1 | × | 4 |
| | | | | Hk302 | 3 | × | 6 |
| | | | | Hk303 | 4 | × | 1 |
| | | | | Hk304 | 2 | ○ | 1 |
| | HISTORY (Azuchi-Momoyama Period) | H-aduchi-1 | 2010/10/22 11:00:10 | Ha101 | 2 | × | 4 |
| | | | | Ha102 | 2 | × | 6 |
| | | | | Ha103 | 2 | × | 1 |
| | | | | Ha104 | 4 | ○ | 1 |

STUDENT ANSWER DB 55

F I G. 4 D

GRADE-BY-CATEGORY DB 56

| CATEGORY | DRILL ID | DRILL ADMINISTERING DATE | CORRECT-ANSWER PERCENTAGE |
|---|---|---|---|
| HISTORY (Kamakura Period) | H-kamakura-1 | 2010/10/14 | 25 |
| | | 2010/9/11 | 50 |
| | | 2010/8/3 | 25 |
| | H-kamakura-2 | 2010/10/5 | 45 |
| | | 2010/9/4 | 80 |
| | H-kamakura-3 | 2010/10/22 | 80 |
| | | 2010/9/14 | 45 |
| HISTORY (Azuchi-Momoyama Period) | H-aduchi-1 | 2010/10/22 | 45 |
| | | 2010/9/14 | 45 |
| HISTORY (Early Edo Period) | H-edo-1 | 2010/10/22 | 60 |
| | | 2010/9/14 | 45 |

F I G. 4 E

CONDITION DB 57

| CONDITION | SUPPLEMENTAL CONDITION | PRESENTED QUESTION |
|---|---|---|
| CURRENT CORRECT-ANSWER PERCENTAGE/LAST CORRECT-ANSWER PERCENTAGE≧1.3 | CORRECT-ANSWER PERCENTAGE OF CURRENT DRILL INCREASES BY 30% OR MORE FROM CORRECT-ANSWER PERCENTAGE OF LAST DRILL | QUESTION ANSWERED INCORRECTLY IN LAST DRILL |
| CURRENT CORRECT-ANSWER PERCENTAGE/LAST CORRECT-ANSWER PERCENTAGE・0.7 | CORRECT-ANSWER PERCENTAGE OF CURRENT DRILL DECREASES BY 30% OR MORE FROM CORRECT-ANSWER PERCENTAGE OF LAST DRILL | QUESTION ANSWERED CORRECTLY IN LAST DRILL |
| CURRENT CORRECT-ANSWER PERCENTAGE/LAST CORRECT-ANSWER PERCENTAGE≧1.2 AND LAST CORRECT-ANSWER PERCENTAGE/SECOND TO THE LAST CORRECT-ANSWER PERCENTAGE≦0.8 | CORRECT-ANSWER PERCENTAGE OF CURRENT DRILL INCREASES BY 20% OR MORE FROM CORRECT-ANSWER PERCENTAGE OF LAST DRILL AND CORRECT-ANSWER PERCENTAGE OF LAST DRILL DECREASES BY 20% OR MORE FROM CORRECT-ANSWER PERCENTAGE OF SECOND TO THE LAST DRILL | QUESTION ANSWERED INCORRECTLY IN LAST DRILL |
| CURRENT CORRECT-ANSWER PERCENTAGE/LAST CORRECT-ANSWER PERCENTAGE≦0.8 AND LAST CORRECT-ANSWER PERCENTAGE/SECOND TO THE LAST CORRECT-ANSWER PERCENTAGE≧1.2 | CORRECT-ANSWER PERCENTAGE OF CURRENT DRILL DECREASES BY 20% OR MORE FROM CORRECT-ANSWER PERCENTAGE OF LAST DRILL AND CORRECT-ANSWER PERCENTAGE OF LAST DRILL INCREASES BY 20% OR MORE FROM CORRECT-ANSWER PERCENTAGE OF SECOND TO THE LAST DRILL | QUESTION ANSWERED CORRECTLY IN LAST DRILL |
| (CURRENT CORRECT-ANSWER PERCENTAGE/LAST CORRECT-ANSWER PERCENTAGE≧0.9 AND CURRENT CORRECT-ANSWER PERCENTAGE/LAST CORRECT-ANSWER PERCENTAG≦1.1) AND CURRENT CORRECT-ANSWER PERCENTAGE/ SECOND TO THE LAST CORRECT-ANSWER PERCENTAGE≦0.8 | CHANGE IN CORRECT-ANSWER PERCENTAGE OF CURRENT DRILL FROM CORRECT-ANSWER PERCENTAGE OF LAST DRILL IS WITHIN 10% AND CORRECT-ANSWER PERCENTAGE OF CURRENT DRILL DECREASES BY 20% OR MORE FROM CORRECT-ANSWER PERCENTAGE OF SECOND TO THE LAST DRILL | QUESTION ANSWERED CORRECTLY IN SECOND TO THE LAST DRILL |

F I G. 4 F (a)

CONDITION DB 57

| CONDITION | SUPPLEMENTAL CONDITION | PRESENTED QUESTION |
|---|---|---|
| (CURRENT CORRECT-ANSWER PERCENTAGE/LAST CORRECT-ANSWER PERCENTAGE≧0.9 AND CURRENT CORRECT-ANSWER PERCENTAGE/LAST CORRECT-ANSWER PERCENTAG≦1.1) AND CURRENT CORRECT-ANSWER PERCENTAGE/SECOND TO THE LAST CORRECT-ANSWER PERCENTAGE≧1.2 | CHANGE IN CORRECT-ANSWER PERCENTAGE OF CURRENT DRILL FROM CORRECT-ANSWER PERCENTAGE OF LAST DRILL IS WITHIN 10% AND CORRECT-ANSWER PERCENTAGE OF CURRENT DRILL INCREASES BY 20% OR MORE FROM CORRECT-ANSWER PERCENTAGE OF SECOND TO THE LAST DRILL | QUESTION ANSWERED INCORRECTLY IN SECOND TO THE LAST DRILL |
| OTHERS |  | QUESTION ANSWERED INCORRECTLY IN LAST DRILL OR SECOND TO THE LAST DRILL |

F I G. 4 F (b)

REMAINING-TIME ADMINISTERING
DRILL TABLE 58

| CATEGORY | DRILL ID | QUESTION ID | LAST CORRECT/ INCORRECT | LAST ANSWERING TIME (m) | CURRENT ANSWER | CURRENT CORRECT/ INCORRECT | CURRENT ANSWERING TIME (m) |
|---|---|---|---|---|---|---|---|
| HISTORY (Kamakura Period) | H-kamakura-1 | Hk102 | × | 2 | 1 | ○ | 3 |
| | | Hk103 | × | 1 | 1 | × | 2 |
| | | Hk104 | × | 2 | 3 | ○ | 1 |

F I G. 4 G

RECEIVED QUESTION TABLE 62

| DRILL ID | QUESTION ID | QUESTION | CHOICE 1 | CHOICE 2 | CHOICE 3 | CHOICE 4 | CORRECT ANSWER |
|---|---|---|---|---|---|---|---|
| H-kamakura-4 | Hk401 | What year of the Western calendar the Kamakura Shogunate was established? | 1182 | 1192 | 1197 | 1199 | 2 |
| | Hk402 | Who established the Kamakura Shogunate? | Minamoto-no-Yoshitsune | Minamoto-no-sadaie | Minamoto-no-yoshitomo | Minamoto-no-yoritomo | 4 |
| | Hk403 | What was the name of the place to take complaints established by the Kamakura Shogunate? | Court | Complaint office | Board of Inquiry | Order Office | 3 |
| | Hk404 | What was the war initiated by the ex-emperor Go-Toba to put down the Kamakura Shogunate? | Onin War | Battle of Sekigahara | Go-toba's Rebellion | Jokyu Disturbance | 4 |

F I G. 4 H

Here's your result of the drill. (drill ID: H-kamakura-4)

| QUESTION ID | QUESTION | YOUR ANSWER | CORRECT ANSWER | CORRECT/ INCORRECT |
|---|---|---|---|---|
| Hk401 | What year of the Western calendar the Kamakura Shogunate was established? | 2 (1192) | 2 (1192) | ○ |
| Hk402 | Who established the Kamakura Shogunate? | 4 (Minamoto-no-yoritomo) | 4 (Minamoto-no-yoritomo) | ○ |
| Hk403 | What was the name of the place to take complaints established by the Kamakura Shogunate? | 3 (Board of Inquiry) | 3 (Board of Inquiry) | ○ |
| Hk404 | What was the war initiated by the ex-emperor Go-Toba to put down the Kamakura Shogunate? | 4 (Jokyu Disturbance) | 4 (Jokyu Disturbance) | ○ |

F I G. 9

ANSWER SCREEN (QUESTION ID: Hk401)

What year of the Western calendar the Kamakura Shogunate was established?
○1182  ○1192  ○1197  ○1199

| SEND ANSWER | CLEAR | DRILL COMPLETED |

F I G. 1 0

```
Questions in the past will be administered in
the remaining time.
(QUESTION ID: Hk102)

What was the political system set up by the Hojo clan?
◯Consulate  ◯Legislation  ◯Surgeon  ◯Regency
```

[ SEND ANSWER ]   [ CLEAR ]

F I G. 1 2

```
Questions in the past will be administered in
the remaining time.
(QUESTION ID: Hk102)

What was the political system set up by the Hojo clan?
○Consulate  ○Legislation  ○Surgeon  ○Regency YOUR ANSWER      ○Consulate   [INCORRECT]
CORRECT ANSWER   ●Regency

GO TO NEXT QUESTION
```

F I G. 1 3

EXAMINATION SUPPORT APPARATUS, AND EXAMINATION SUPPORT METHOD

CROSS-REFERENCE TO RELATED APPLICATION

This application is a continuation application of International Application PCT/JP2011/056316 filed on Mar. 16, 2011 and designated the U.S., the entire contents of which are incorporated herein by reference.

FIELD

The embodiments discussed herein relate to an education support technology.

BACKGROUND

In an examination in which the same questions are given to plural examinees, in general, the plural examiners are required to give answers within a predetermined uniform time limit. In such an examination, some examinees who had finished answering the questions early would have remaining time and not know what to do. Effective use of this remaining time has been sought.

As an example of the effective use of the above-described remaining time, an attempt to give additional questions later to the examinees has been conventionally made. Further improvement in the understanding of the examinees is the main object of this attempt. However, because the remaining time is different for each examinee and questions to improve the understanding are also different for each examinee, it is not always proper if the examinees are given the same additional questions. In consideration of this circumstance, when additional questions are added, it is desirable to give questions that are different in the number of questions and contents of the questions for each examinee in accordance with the examination time and the understanding of each examinee.

Some technologies have been known relating to test-giving devices that give questions in which the number and contents of questions being given in accordance with the examination time and the understanding of the examinees. One of the technologies is to give as many exercise questions that suit a purpose of a student, such as a review of the studied field or proficiency tests, as the number of questions that should be able to be solved within a time that the student has. Another one of the technologies is to give more elaborate questions for each student in consideration of the questions to which the student has given an incorrect answer. In this technology, history of question that the student has given an incorrect answer to is stored, and the questions that the student has given an incorrect answer to are given in the second time or the subsequent time.

In order to give questions with contents in accordance with the understanding of the examinee, it is necessary to assess the understanding of the examinee. In order to assess this understanding, information such as a correct/incorrect answer status to various types of questions given in examinations that the examinee has taken in the past and a correct-answer percentage of the examination is used.

However, the understanding of the examinee is not always correctly represented by these pieces of information. For example, even if an examinee's answer to a question that allowed the examinee to select a correct choice from multiple choices is a correct answer, the process to derive the correct answer, i.e., whether the examinee obtained the answer on his/her own or the answer is mere product of chance, is not determined from the fact of the correct answer. This is also true for the case in which the examinee's answer to a question that allowed the examinee to select a correct choice from multiple choices was incorrect. In other words, whether the cause of the incorrect answer is lack of ability of the examinee or a minor careless mistake is not determined from the fact of the incorrect answer.

In regard to the technology to properly assess the understanding of the examinee, a technology of a study information processing apparatus has been known, and the apparatus properly evaluates an ability of examinees but does not change as the difficulty of examination questions changes, and supports the studying of the examinees in an efficient and effective manner. In this technology, determination of the understanding of the examinee on the examination questions is made on the basis not only of whether answers made by the examinees to the examination questions are correct or incorrect, but of a correct-answer percentage of the examinee for the entire examination and a reference correct-answer percentage set for each of the examination questions in advance. In this manner, this technology provides a proper evaluation of ability of examinees and allows for a determination of whether correctness/incorrectness of the answer to each examination question reflected the understanding of the examinee, resulted from chance, or resulted from a minor careless mistake.

PATENT DOCUMENT

Patent Document 1: International Publication No. 2003-050782
Patent Document 2: Japanese Laid-Open Patent Publication No. 7-334069
Patent Document 3: Japanese Laid-Open Patent Publication No. 2007-248773

SUMMARY

In the above-described technology of the study information processing apparatus, it is necessary to set in advance a reference correct-answer percentage of each question at the examination administrator side. However, in order to set this reference correct-answer percentage, very troublesome tasks are required such as performing calculations using statistical theory for each question. It is not possible to determine the understanding of an examinees by comparing the reference correct-answer percentage with the correct-answer percentage of the examinees. This is because this comparison is a comparison between the understanding of the whole and the understanding of the individual, and does not assess the change in the understanding of an individual with time. In order to determine the understanding, it is necessary to assess a change in the current correct-answer percentage from the past correct-answer percentage in a particular field, which is a subject of the examination questions.

In view of the above-described questions, the examination support apparatus described later in this specification reduces the workload required to properly assess the understanding of the examinees at the examination administrator side and enhances the accuracy of determination of the understanding of the examinees.

One of the examination support apparatuses described later in this specification includes a question database, an answer status database, a question output unit, an answer acquisition unit, a correct/incorrect determination unit, a calculation unit, and a determination unit. Here, the question database stores a plurality of examination questions in a prescribed field in association with an administering section to be administered. The answer status database stores a question identifier to identify each of the examination questions, an examinee identifier to identify an examinee, and an answer status of each of the examination questions answered by the examinee in association with the administering section in which the examination questions in the prescribed field are administered. The question output unit extracts the examination questions associated with the same administering section from the question database and outputs the examination questions to an examinee terminal operated by the examinee. The answer acquisition unit acquires an answer of the examinees to each of the examination questions from the examinee terminal. The correct/incorrect determination unit determines whether the acquired answer is correct or incorrect. The calculation unit calculates for the examinee a correct-answer percentage to the examination questions in the same administering section in the prescribed field based on a result of the correct/incorrect determination. The determination unit calculates a change in a correct-answer percentage for the examinee from the correct-answer percentage for the examinee of the examination questions in the same administering section in the prescribed field stored in the answer status database and the correct-answer percentage calculated by the calculation unit, and determines the change in the correct-answer percentage.

In one of the examination support methods described later in this specification, a computer performs the following procedures The procedure, first, extracts from a question database storing a plurality of examination questions in a prescribed field in association with an administering section to be administered, an examination question associated with a same administering section, and transmits the examination question to an examinee terminal operated by an examinee. The procedure determines whether an answer to the examination question acquired from the examinee terminal is correct or incorrect. The procedure calculates for the examinee a correct-answer percentage of the examination questions in the same administering section in the prescribed field based on a result of the determination of whether the answer is correct or incorrect. The procedure refers to an answer status database storing a question identifier to identify each of the examination questions, an examinee identifier to identify an examinee, and an answer status of each of the examination questions answered by the examinee in association with the administering section in which the examination questions in the prescribed field are administered, identifying the correct-answer percentage of the examinee of examination questions in a particular administering section in the prescribed field, calculates a change in the correct-answer percentage of the examinee from the identified correct-answer percentage and the calculated correct-answer percentage, and determines a change in the correct-answer percentage.

In one of storage media described later in this specification stores an examination support program that causes a computer to analyze a status of answer by an examinee to examination question. This examination support program causes the computer to execute the following processing. The processing, first, extracts from a question database storing a plurality of examination questions in a prescribed field in association with an administering section to be administered, an examination question associated with a same administering section, and transmits the examination question to an examinee terminal operated by an examinee. The processing determines whether an answer to the examination question acquired from the examinee terminal is correct or incorrect. The processing calculates for the examinee a correct-answer percentage of the examination questions in the same administering section in the prescribed field based on a result of the determination of whether the answer is correct or incorrect. The processing refers to an answer status database storing a question identifier to identify each of the examination questions, an examinee identifier to identify an examinee, and an answer status of each of the examination questions answered by the examinee in association with the administering section in which the examination questions in the prescribed field are administered, identifying the correct-answer percentage of the examinee of examination questions in a particular administering section in the prescribed field, calculates a change in the correct-answer percentage of the examinee from the identified correct-answer percentage and the calculated correct-answer percentage, and determines a change in the correct-answer percentage.

The examination support apparatus described later in this specification has technical advantages of reducing the workload required to properly assess the understanding of the examinees at the examination administrator side and enhancing the accuracy of determination of the understanding of the examinees.

BRIEF DESCRIPTION OF DRAWINGS

FIG. 1 is a functional block diagram illustrating an embodiment of an examination support apparatus;

FIG. 4A is a diagram illustrating a data structure of a student DB;

FIG. 4B is a diagram illustrating a data structure of a drill DB;

FIG. 4C is a diagram illustrating a data structure of a drill start time table;

FIG. 4D is a diagram illustrating a data structure of the student answer DB;

FIG. 4E is a diagram illustrating a data structure of a grade-by-category DB;

FIG. 4F(a) is a diagram illustrating a data structure of a condition DB;

FIG. 4F(b) is a diagram illustrating a data structure of a condition DB;

FIG. 4G is a diagram illustrating a data structure of a remaining-time drill table;

FIG. 4H is a diagram illustrating a data structure of a received question table;

FIG. 9 is an example screen of a display screen of a drill result;

FIG. 10 is an example screen of a question presenting screen;

FIG. 12 is an example screen of an additional question presenting screen; and

FIG. 13 is an example display screen of an answer result of an additional examination question.

DESCRIPTION OF EMBODIMENTS

Figure 2:
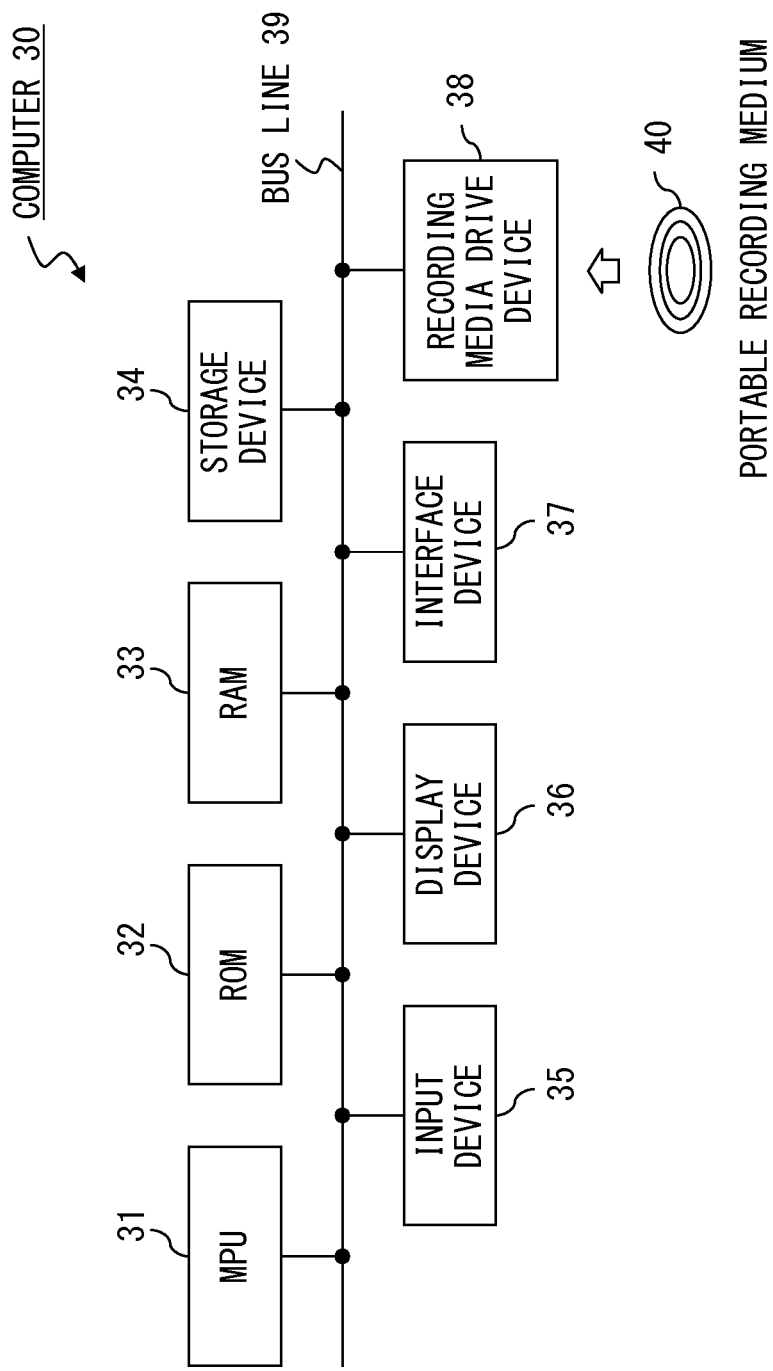
FIG. 2 illustrates an example of a hardware configuration of a computer.

FIG. 1 is explained first. FIG. 1 is a functional block diagram illustrating an embodiment of an examination support apparatus.

This examination support apparatus 1 is provided with a question DB 11, an answer status DB 21, a question output unit 12, an answer acquisition unit 13, a correct/incorrect determination unit 14, a calculation unit 15, and a determination unit 16. Note that the examination support apparatus 1 can exchange various data with examinee terminals 2 operated by examinees via a wireless communication path or a wired communication path.

The question DB (question database) 11 is a database storing plural examination questions in a prescribed field in association with administering sections to be administered.

The answer status DB 21 is a database storing a question identifier to identify each of the examination questions, an examinee identifier to identify an examinee, and an answer status of each of the examination questions answered by the users in association with administering sections in which the above-described examination question in a prescribed field is administered.

The question output unit 12 extracts examination questions associated with the same administering section from the question DB 11 and outputs the questions to the examinee terminals 2.

The answer acquisition unit 13 acquires from the examinee terminals 2 answers of the examinees to the examination questions output from the question output unit 12.

The correct/incorrect determination unit 14 determines whether the answers, which are acquired by the answer acquisition unit 13, are correct or incorrect.

The calculation unit 15 calculates for the above-described examinees a correct-answer percentage to the examination questions in the prescribed field associated with the same administering section based on a result of the determination of whether answers acquired by the answer acquisition unit 13 are correct or incorrect, which is made by the correct/incorrect determination unit 14.

A determination unit 16 calculates a change in a correct-answer percentage for the examinees based on a correct-answer percentage for the examinees of the examination questions in the same administering section in the prescribed field stored in the answer status DB 21 and the correct-answer percentage calculated by the calculation unit 15, and determines the change in the correct-answer percentage.

This examination support apparatus 1 determines whether or not it is reasonable to consider that the correct-answer percentage calculated by the calculation unit 15 represents the examinee's understanding of the prescribed field based on the change in the correct-answer percentage by the examinees. Accordingly, whether or not the correct-answer percentage calculated by the calculation unit 15 reflects properly on the examinee's understanding of the prescribed field is determined without cumbersome operations such as examination administrators preparing a correct-answer percentage of examination questions in advance.

It should be noted that the question output unit 12 may identify examination questions associated with an administering section that is different from an administering section of examination questions used in the calculation of the correct-answer percentage of the examinees performed by the calculation unit 15 by referring to the answer status DB 21 based on the determination result of the change in the correct-answer percentage. At that time, the question output unit 12 extracts the identified examination questions from the question DB 11 and outputs the extracted questions to the examinee terminals 2.

In the examination support apparatus 1 provided with this question output unit 12, when it is determined that it is not reasonable to consider that the correct-answer percentage calculated by the calculation unit 15 represents understanding, new examination questions in the above-described prescribed field are added and are on the examination taken by the above-described examinee. Accordingly, it is possible to more properly assess the examinee's understanding of the prescribed field by considering the correctness/incorrectness of the examinee's answers to the added examination questions.

It should be noted that the question output unit 12 may extract the identified examination questions from the question DB 11 and output them to the examinee terminal 2 only when a time elapsed from an input of a start instruction to start examination including the examination questions of the same administering section is less than a prescribed time indicating the time limit of the examination.

In this case, the elapsed time being less than a prescribed time means that it is expected that there is some time remaining to solve new questions until the termination time of the examination. In the above-described examination support apparatus 1, since additional examination questions will be on the examination only in this case, it is possible to make effective use of the remaining time, and improvement of further understanding of the examinees can be expected.

In the answer status DB 21, an answering time from a time at which an examination question corresponding to the question identifier is displayed on the examinee terminals 2 to a time at which an answer is input may be stored in association with the question identifier.

It should be noted that, in this case, the answer acquisition unit 13 further acquires an answering time from the examinee terminals 2. The question output unit 12 identifies examination questions associated with an answering time that is equal to or less than a difference between the above-described prescribed time indicating the time limit and the above-described elapsed time from among examination questions of an administering section different from the administering section of examination questions used to calculate the above-described correct-answer percentage by referring to the answer status DB 21. Then, the question output unit 12 extracts and outputs the identified examination questions from the question DB 11.

In this manner, the examination support apparatus 1 let the examinees review the above-described prescribed field by giving the examinees the examination questions answered in the past once again as additional examination questions. As a result, it is possible to check a proficiency level by the examinee to the past course content in this field and it is possible to speculate on the course item in the field in which the examinee's proficiency level is insufficient. Moreover, since the examinee's answering time when the additional examination questions were given in the past is shorter than the above-described remaining time, it is unlikely that the additional examination questions would not be answered due to the shortness of time.

Furthermore, the answer status DB 21 may further store the date and time to administer the examination including the above-described examination questions of the same administering section in association with the above-described administering section.

At that time, the determination unit 16 refers to the answer status DB 21 first, and identifies a correct-answer percentage of the examination questions of the second administering section with which a date and time which is closest to the date and time to administer an examination of the examination questions used to calculate the correct-answer percentage is associated. The determination unit 16 then determines whether or not the change from the identified correct-answer percentage of the second administering section to the correct-answer percentage of the first administering section is a first change, which is an increase by a prescribed threshold or greater. Here, when the determination unit 16 determines that the change is the first change, the question output unit 12 refers to the answer status DB 21, and identifies examination questions that are associated with an administering section different from the first administering section and for which the answer status of the above-described examinee is incorrect answers. The identified examination questions are extracted and output from the question DB 11.

In the case of the above-described first change, the determination unit 16 determines that it is not reasonable to consider that the correct-answer percentage of the first administering section represents the understanding of the examinee because the level of increase from the correct-answer percentage of the second administering section to the correct-answer percentage of the first administering section is excessive. In such a case, the examination support apparatus 1 gives examination questions answered incorrectly from among the examination questions of an administering section different from the first administering section as the additional examination questions. Here, when the correct-answer percentage of the answers by the examinee to the additional examination questions is high, it is possible to determine that the correct-answer percentage calculated by the calculation unit 15 is considered to represent the above-described understanding. Meanwhile, when the correct-answer percentage of the answers by the examinee to the additional examination questions is low, it is possible to determine that the correct-answer percentage calculated by the calculation unit 15 is not considered to represent the above-described understanding.

Alternatively, the determination unit 16, at that time, refers to the answer status DB 21 first, and identifies a correct-answer percentage of the examination questions of the second administering section with which a date and time which is closest to the date and time to administer an examination of the examination questions used to calculate the correct-answer percentage is associated. The determination unit 16 then determines whether or not the change from the identified correct-answer percentage of the second administering section to the correct-answer percentage of the first administering section is a second change, which is a decrease by a prescribed threshold or greater. Here, when the determination unit 16 determines that the change is the second change, the question output unit 12 refers to the answer status DB 21. The question output unit 12 identifies examination questions that are associated with an administering section different from the administering section of the examination questions used to calculate the above-described correct-answer percentage and for which the answer status of the above-described examinee is correct answers. The identified examination questions are extracted and output from the question DB 11.

In the case of the above-described second change, the determination unit 16 determines that it is not reasonable to consider that the correct-answer percentage of the first administering section represents the understanding of the examinee because the level of decrease from the correct-answer percentage of the second administering section to the correct-answer percentage of the first administering section is excessive. In such a case, the examination support apparatus 1 gives examination questions answered incorrectly from among the examination questions of an administering section different from the administering section of the examination questions used to calculate the above-described correct-answer percentage as the additional examination questions. Here, when the correct-answer percentage of the answers by the examinee to the additional examination questions is low, it is possible to determine that the correct-answer percentage calculated by the calculation unit 15 is considered to represent the above-described understanding of the examinee. Meanwhile, when the correct-answer percentage of the answers of the examinee for the additional examination questions is high, it is possible to determine that the correct-answer percentage calculated by the calculation unit 15 is not considered to represent the above-described understanding.

It should be noted that in the case of the above-described first change, the determination unit 16 may further refer to the answer status DB 21 and identify a correct-answer percentage of the examination questions of a third administering section with which a date and time which is prior to and closest to the date and time to administer the second administering section is associated. In this case, the determination unit 16 may determine whether or not the change from the identified correct-answer percentage of the third administering section to the correct-answer percentage of the second administering section is a third change, which is a decrease by a prescribed threshold or greater. Here, when the determination unit 16 determines that the change is the first change, the question output unit 12 refers to the answer status DB 21 first. The question output unit 12 identifies examination questions that are associated with an administering section different from the first administering section and for which the answer status of the above-described examinee is incorrect answers, and the identified examination questions are extracted and output from the question DB 11.

The above-described third change is a case in which the correct-answer percentage of the above-described second administering section is excessively decreased from the correct-answer percentage of the third administering section, whereas the correct-answer percentage of the first administering section is excessively increased from the correct-answer percentage of the second administering section. In this case, it is determined that it is not reasonable to consider that the correct-answer percentage calculated by the calculation unit 15 represents the understanding of the examinee. The examination support apparatus 1, in this case, gives examination questions answered incorrectly from among the examination questions associated with an administering section different from the first administering section as the additional examination questions. Here, when the correct-answer percentage of the answers by the examinee to the additional examination questions is high, it is possible to determine that the correct-answer percentage calculated by the calculation unit 15 is considered to represent the above-described understanding of the examinee. Meanwhile, when the correct-answer percentage of the answers by the examinee to the additional examination questions is low, it is possible to determine that the correct-answer percentage calculated by the calculation unit 15 is not considered to represent the above-described understanding.

Moreover, in the case of the above-described second change, the determination unit 16 may further refer to the answer status DB 21 and identify the correct-answer percentage of the third administering section associated with a date and time before and closest to the date and time of the second administering section. In this case, the determination unit 16 may determine whether or not the change from the identified correct-answer percentage of the third administering section to the correct-answer percentage of the second administering section is a fourth change, which is an increase by a prescribed threshold or greater. Here, when the determination unit 16 determines that the change is the fourth change, the question output unit 12 refers to the answer status DB 21 first. The question output unit 12 identifies examination questions that are associated with an administering section different from the first administering section and for which the answer status of the above-described examinee is correct answers, and the identified examination questions are extracted and output from the question DB 11.

The above-described fourth change is a case in which the correct-answer percentage of the above-described second administering section is excessively increased from the correct-answer percentage of the third administering section, whereas the correct-answer percentage of the first administering section is excessively decreased from the correct-answer percentage of the second administering section. In this case, it is determined that it is not reasonable to consider that the correct-answer percentage calculated by the calculation unit 15 represents the understanding of the examinee. The examination support apparatus 1, in this case, gives examination questions answered correctly from among the examination questions associated with an administering section different from the first administering section as the additional examination questions. Here, when the correct-answer percentage of the answers by the examinee to the additional examination questions is low, it is possible to determine that the correct-answer percentage calculated by the calculation unit 15 is considered to represent the above-described understanding of the examinee. Meanwhile, when the correct-answer percentage of the answers by the examinee to the additional examination questions is high, it is possible to determine that the correct-answer percentage calculated by the calculation unit 15 is not considered to represent the above-described understanding.

Moreover, the determination unit 16 may be the following unit. More specifically, the determination unit 16 refers to the answer status DB 21 and identifies a correct-answer percentage of the examination questions of the second administering section with which a date and time which is closest to the date and time to administer an examination of the first administering section of the examination questions used to calculate the above-described correct-answer percentage is associated. In addition, the determination unit 16 identifies a correct-answer percentage of the examination questions of the third administering section with which the date and time prior to and closest to the date and time to administer the examination of the second administering section is associated. Then a change from the correct-answer percentage of the second administering section to the correct-answer percentage of the first administering section and a change from the correct-answer percentage of the third administering section to the correct-answer percentage of the first administering section are identified. At that time the question output unit 12 may identify examination questions associated with an administering section different from the first administering section based on the identified changes and the identified examination questions may be extracted and output from the question DB 11.

It should be noted that both the examination support apparatus 1 and the examinee terminal 2 in FIG. 1 may be configured by using computers with a standard configuration.

Here, FIG. 2 is explained. FIG. 2 illustrates an example of a hardware configuration of a computer.

This computer 30 is provided with an MPU 31, a ROM 32, a RAM. 33, a storage device 34, an input device 35, a display device 36, an interface device 37, and a recording media drive device 38. Note that these components are connected with each other via a bus line 39 and can exchange various data under the control of the MPU 31.

The MPU (Micro Processing Unit) 31 is an arithmetic processing unit to control operators of the entire computer 30.

The ROM (Read Only Memory) 32 is a read-only semiconductor memory in which prescribed basic control programs are recorded in advance. The MPU 31 reads out the basic control program at the time of startup of the computer 30 and executes the programs, and as a result, operations of each of the components in this computer 30 can be controlled.

The RAM (Random. Access Memory) 33 is a semiconductor memory that is writable and readable as needed and is used as a working storage region if needed when the MPU 31 executes various control programs.

The storage device 34 is a device to store various control programs and various pieces of data executed by the MPU 31. The MPU 31 is able to perform various control processing by reading and executing a prescribed control program stored in the storage device 34. Note that for the storage device 34, a hard disk device or a flash SSD (Solid State Drive) device, which uses a flash memory as a storage medium, may be used as an example.

The input device 35 is a keyboard device or a mouse device, for example, and when the device is operated by a user of the computer 30, the device obtains inputs of various pieces of information from the user which are associated with the operation contents and transmits the obtained input information to the MPU 31.

The display device 36 is a liquid crystal display, for example, and displays various pieces of text and images in accordance with the display data transmitted from the MPU 31.

It should be noted that for the input device 35 and the display device 36, a touch panel provided with functions of these two devices and provided with a transparent position input device such as a touch pad on a display surface of the display unit such as a liquid crystal panel may be used.

The interface device 37 manages exchange of various pieces of information between various pieces of equipment connected to the computer 30. For example, when the examination support apparatus 1 and the examinee terminal 2 are connected via a wired communication path, a wired communication device to connect this computer 30 with the wired communication path is provided as the interface device 37. As another example, when the examination support apparatus 1 and the examinee terminal 2 are connected via a wireless communication path, a wireless communication device to establish a wireless communication path between the examination support apparatus 1 and the examinee terminal 2 is provided as the interface device 37.

The recording media drive device 38 is a device to read out various control programs and data recorded in a portable recording medium 40. The MPU 31 is able to perform various control processing, which is described later, by reading and executing a prescribed control program recorded in the portable recording medium 40 via the recording media drive device 38. Note that for the portable recording medium 40, a CD-ROM (Compact Disc Read Only Memory), a DVD-ROM (Digital Versatile Disc Read Only Memory), or a flash memory with a USB (Universal Serial Bus) connector may be used.

In order to cause the computer 30 configured in the above manner to function as the examination support apparatus 1, a control program is generated to cause the MPU 31 to execute various types of control processing, which is described later, executed by the examination support apparatus 1. The generated control program is stored in advance in the storage device 34 or the portable recording medium 40. In this control program, the storage device 34 functions as the question DB 11 or the answer status DB 21. A prescribed instruction is given to the MPU 31 and the MPU 31 reads out and executes the control program. In this manner, it becomes possible to provide the functions of each of the components in the examination support apparatus 1 with the computer 30 so that the computer 30 functions as the examination support apparatus 1.

When the computer 30 with the above-described configuration is caused to function as the examinee terminal 2, similarly, a control program is generated to cause the MPU 31 to execute various types of control processing, which is described later, executed by the examinee terminal 2. The generated control program is stored in advance in the storage device 34 or the portable recording medium 40. A prescribed instruction is given to the MPU 31 and the MPU 31 reads out and executes the control program. In this manner, the computer 30 functions as the examinee terminal 2.

In the following description, a program executed by the MPU 31 to make the computer 30 function as the examination support apparatus 1 or the examinee terminal 2 is explained.

Figure 3:
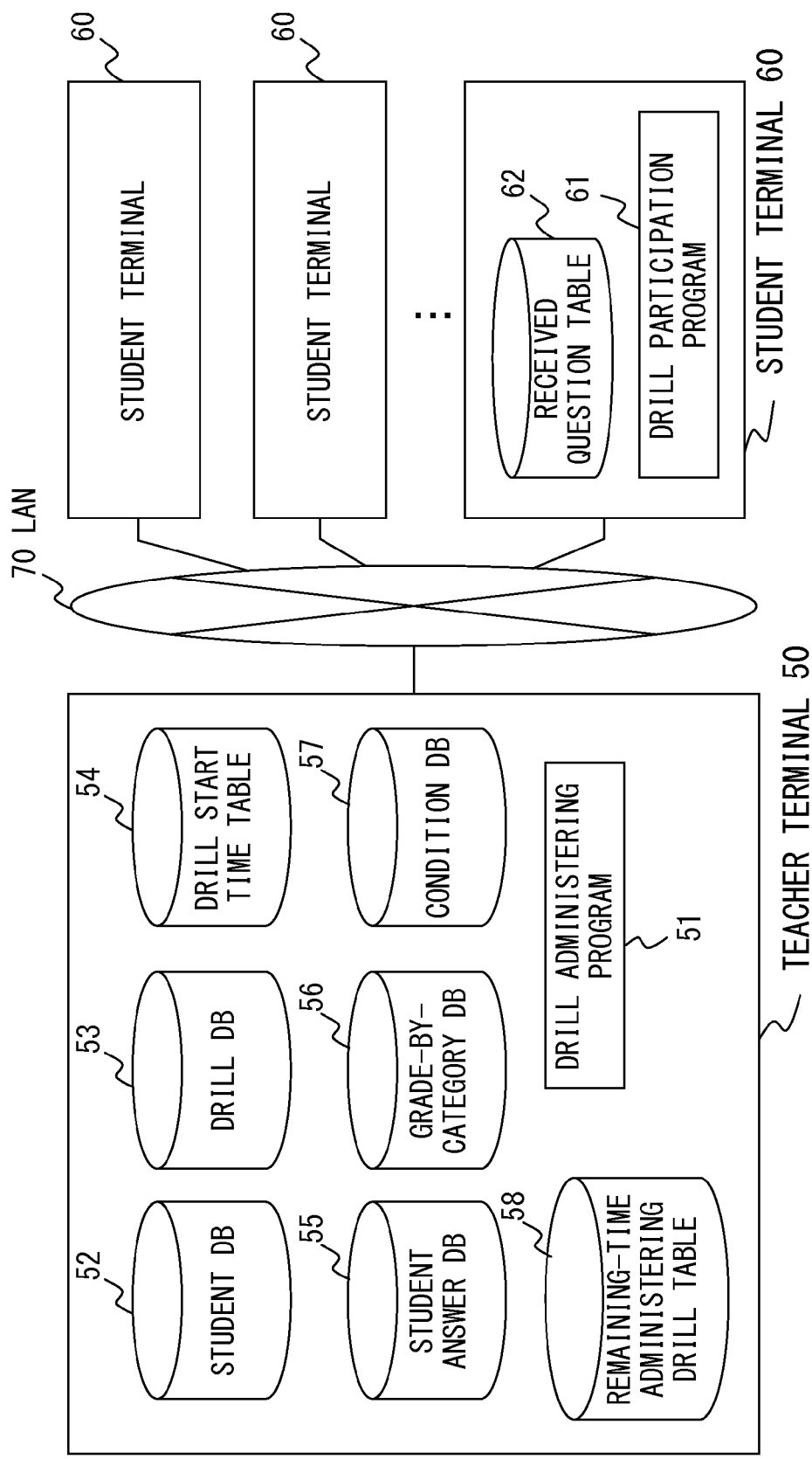
FIG. 3 illustrates an example of usages of the examination support apparatus.

It should be noted that the following description explains an example of a case in which the examination support apparatus 1 in FIG. 1 is used to administer a drill (exercise) that consists of plural examination questions given by a teacher to plural students as a part of a class in a field of education such as a classroom in a school. FIG. 3 is a diagram illustrating an example of usages of the examination support apparatus 1.

In this example, the examination support apparatus 1 in FIG. 1 is used as a teacher terminal 50 used by a teacher. The examinee terminals 2 in FIG. 1 are used as student terminals 60, which are operated by each of the plural students. The teacher terminal 50 and the student terminal 60 are connected with one another via a LAN (Local Area Network) 70 provided in a classroom so as to be able to exchange various data with one another.

Moreover, in order to cause the computer 30 in FIG. 2 to function as the teacher terminal 50 or the student terminal 60, in FIG. 3, a list of programs, databases, and tables held in the storage device 34 of the computer 30 is illustrated. Note that in this example, the above-described control program is stored in advance in the storage device 34.

The storage device 34 at the teacher terminal 50 end holds a drill administering program 51, a student DB (database) 52, a drill DB 53, a drill start time table 54, a student answer DB 55, a grade-by-category DB 56, a condition DB 57, and a remaining-time administering drill table 58. On the other hand, the storage device 34 at the student terminal 60 end holds a drill participation program 61 and a received question table 62.

Next, data structures of these databases and data tables are explained.

It should be noted that in this example, all examination questions given as a drill are multiple choice questions that make a student select one of four choices.

The student DB 52 is explained first. The student DB 52 is a database storing identification information of students who operate the student terminals 60. FIG. 4A is a diagram illustrating a data structure of the student DB 52.

The student DB 52 is a database configured of each piece of data including "student ID", "password", and "student name", which are associated with each record. Here, the "student ID" is identification information data assigned to each student who operates the student terminal 60. The "password" is data used to authenticate the student identified by the "student ID", and is set in advance by the student himself/herself. The "student name" is data of a name of the student identified by the "student ID".

Next, the drill DB 53 is explained. The drill DB 53 is a database storing plural examination questions given in the drill in association with the administering section to be administered, and corresponds to the question DB 11 in the examination support apparatus 1 in FIG. 1. FIG. 4B is a diagram illustrating a data structure of the drill DB 53.

The drill DB 53 stores each piece of data, including "category", "drill ID", "question ID", "question", "choice 1", "choice 2", "choice 3", "choice 4", and "correct answer".

The "category" is data indicating the field (category) to which the examination questions stored in the drill DB 53 pertain. In this embodiment, this "category" data indicates the subject (e.g., "history") and a course unit (e.g., "Kamakura Period") to which the examination questions pertain as a category.

The "drill ID" is identification information data for each drill, and is assigned to each of the drills administered plural times at different dates and times. Plural different "drill IDs" pertain to the "category" data and a drill identified by the "drill ID" data pertains to any of the above-described categories. Note that in this embodiment, all questions given in the same drill pertain to the same category.

The "question ID" is identification information data on the examination questions stored in the drill DB 53, and is assigned to each of the examination questions. Plural pieces of different "question ID" data pertain to the "drill ID" data.

The "question" is data of question statements of the examination question stored in the drill DB 53. Each piece of this "question" data is associated with each piece of "question ID" data.

In addition, each piece of the "question" data is associated with four pieces of data, including "choice 1", "choice 2", "choice 3", and "choice 4", and the "correct answer" data on a one-to-one basis. Of these pieces of data, "choice 1", "choice 2", "choice 3", and "choice 4" are data of four choices for the answer of the examination question indicated by the "question" data. The "correct answer" is data indicating which one of "choice 1", "choice 2", "choice 3", and "choice 4" is the correct answer to the examination question indicated by the "question" data, and for example, the data in the "correct answer" being 1 indicates that choice 1 is the correct answer.

As described above, the drill DB 53 stores plural examination questions for each category in association with the administering section identified by the drill ID.

Next, the drill start time table 54 is explained. The drill start time table 54 is a table to store the start data and time of the drill that is currently being administered. As indicated in the data structure diagram in FIG. 4C, the drill start time table 54 stores "year-month-day" data indicating the date on which a drill is administered and "start time" data indicating the start time of the drill.

Next, the student answer DB 55 is explained. The student answer DB 55 is a database to hold a history of answer statuses of students for the examination questions stored in the drill DB 53, and corresponds to the answer status DB 21 of the examination support apparatus 1 in FIG. 1. Note that the student answer DB 55 is prepared for each of plural students, and the student answer DB 55 for each student can be identified by using the above-described "student ID" data assigned to each student. FIG. 4D is a diagram illustrating a data structure of the student answer DB 55.

The student answer DB 55 stores each piece of data, including "student ID", "category", "drill ID", "drill administering date and time", "question ID", "answer", "correct/incorrect", and "answering time".

is identification information data assigned to each student who operates the student terminal 60.

The "category" is data indicating a category to which the examination questions given to a drill that the student participated in pertains.

The "drill ID" is identification information data of the drill that the student participated in. In the student answer DB 55, the "drill ID" data is associated with the "category" data, and this association indicates the category to which the drill identified by the "drill ID" data pertains.

The "drill administering date and time" is data of the date and time at which the drill identified by the "drill ID" data is administered. This provides the chronological order of the administering of the drill IDs. In the drill administering date and time, information on the date and time at which a drill start instruction is input from the input device 35 of the teacher terminal 50 is recorded. This "drill administering date and time" indicates the administering section of the examination to be administered as well as the "drill ID".

The "question ID" is identification information data of the examination questions assigned to the examination questions given in the drill that the student participated in. In the student answer DB 55, the "question ID" data is associated with the "drill ID" data and this association indicates that the question identified by the "question ID" data is given to in the drill identified in the "drill ID" data.

Each piece of the "question ID" data is associated with "answer", "correct/incorrect", and "answering time" on a one-to-one basis. Here, the "answer" is data indicating the student's answer (information specifying one of four choices) to the question that is given in the drill identified by the "drill ID" and is identified by the "question ID". "correct/incorrect" is data indicating whether the student's answer indicated by this "answer" data is a correct answer or an incorrect answer. Note that in the example of FIG. 4D, a circle is displayed when the answer is a correct answer and a cross is displayed when the answer is an incorrect answer. The "answering time" is data indicating a time (by minutes in this example) needed to obtain an answer and input (select) the answer in the student terminal from a time when the student starts to address the question that is identified by the "question ID" and is given in the drill identified by the "drill ID".

As described above, the student answer DB 55 stores answer statuses ("answer", "correct/incorrect", and "answering time") of the examination questions identified by the "question ID" in association with the "drill ID".

Next, the grade-by-category DB 56 is explained. The grade-by-category DB 56 is a database to hold a history of correct-answer percentages of a student in a drill that has been administered. Note that the grade-by-category DB 56 is prepared for each of plural students, and the grade-by-category DB 56 for each student may be identified by using the above-described "student ID" data assigned to each student.

FIG. 4E is a diagram illustrating a data structure of the grade-by-category DB 56.

The grade-by-category DB 56 stores each piece of data including "category", "drill ID", "drill administering date", and "correct answer percentage".

The "category" is data indicating a category to which the examination question given in the drill that the student participated in pertains.

The "drill ID" is identification information data of the drill that the student participated in. In the grade-by-category DB 56, the "drill ID" data is associated with the "category" data, and this association indicates the category to which the drill identified by the "drill ID" data pertains.

The "drill administering date" is data of the date that the drill identified by the "drill ID" is administered. Here, there may be a case in which two or more pieces of "drill administering date" data are associated with a single piece of the "drill ID" data, and this case indicates that a drill of the same contents identified by the "drill ID" data is repeatedly administered. Note that the present embodiment assumes that a drill with the same contents is not repeated on the same date.

The "correct answer percentage" is data indicating the correct answer percentage of the drill identified by the "drill ID" data administered on the administering date identified by the "drill administering date" data. Note that, here, the correct answer percentage of a drill refers to a percentile indicating the proportion of the number of questions answered correctly in the number of questions given in the drill.

Next, the condition DB 57 is explained. The condition DB 57 is a database storing in advance conditions to determine whether or not it is reasonable to conclude that the correct answer percentage of the drill most recently administered to the student indicates the understanding of the student in the category to which the drill pertains. FIG. 4F (a) and FIG. 4F (b) are a diagram illustrating a data structure of the condition DB 57.

The condition DB 57 stores each piece of data, including "condition", "supplemental condition", and "presented question", which are associated with one another.

Of these pieces of data, however, the "supplemental condition" data adds a brief explanation of the condition indicated by the "condition" data, and therefore the "supplemental condition" data may not be included in the condition DB 57.

The "condition" is data indicating the above-described determination conditions. The "presented question" is data indicating an instruction on the examination question additionally given in the drill that is currently being administered when the conditions indicated by the "condition" data are satisfied.

Detailed data contents of each record in the condition DB 57 illustrated in FIG. 4F(a) and FIG. 4F(b) are further explained.

It should be noted that in the following description, a drill that has been most recently administered from among some drills that pertain to a category is referred to as a "current drill", the drill that was administered before the current drill is referred to as a "last drill", and the drill that was administered before the last drill is referred to as a "second to the last drill". In addition, a correct answer percentage in the current drill for a student is referred to as a "current correct answer percentage", and correct-answer percentages in the last drill and the second to the last drill for the student are referred to as a "last correct answer percentage" and a "second to the last correct answer percentage", respectively.

Note that the history of correct-answer percentages for each student is held in the above-described grade-by-category DB 56.

In the record in the first row in the condition DB 57 illustrated in FIG. 4F(a), the "condition" data indicates a condition wherein the current correct answer percentage increases by 30% or more from the last correct answer percentage (the first rate of change). When this condition is met, since there is an excessive increase in the current correct answer percentage from the last correct answer percentage, it does not seem reasonable to conclude that the current correct answer percentage indicates the understanding of the student. In addition, the "presented question" data in this record indicates that the examination questions for which the student's answer was incorrect in the last drill are being additionally given in the drill that is currently being administered.

Next, in the record in the second row, the "condition" data indicates a condition such that the current correct answer percentage decreases by 30% or more from the last correct answer percentage (the second rate of change). When this condition is met, since there has been an excessive decrease in the current correct answer percentage from the last correct answer percentage, it does not seem reasonable to conclude that the current correct answer percentage indicates the understanding of the student. In addition, the "presented question" data in this record indicates that the examination questions for which the student's answer was correct in the last drill are being additionally given in the drill that is currently being administered.

Next, in the record in the third row, the "condition" data indicates a case in which both of the following conditions A and B are satisfied. Here, condition A is that the current correct answer percentage increases by 20% or more from the last correct answer percentage (the third rate of change). Condition B is that the last correct answer percentage decreases by 20% or more from the second to the last correct answer percentage (the fourth rate of change). When both of these two conditions are satisfied, since there has been an excessive increase from the last correct answer percentage to the current correct answer percentage despite an excessive decrease from the second to the last correct answer percentage to the last correct answer percentage, it does not seem reasonable to conclude that the current correct answer percentage indicates the understanding of the student. In addition, the "presented question" data in this record indicates that the examination questions for which the student's answer was incorrect in the last drill are being additionally given in the drill that is currently being administered.

Next, in the record in the fourth row, the "condition" data indicates a case in which both of the following conditions C and D are satisfied. Here, the condition C is that the current correct answer percentage has decreased by 20% or more from the last correct answer percentage (the fifth rate of change). The condition D is that the last correct answer percentage has increased by 20% or more from the second to the last correct answer percentage (the sixth rate of change). When both of these two conditions are satisfied, since there is an excessive decrease from the last correct answer percentage to the current correct answer percentage despite an excessive increase from the second to the last correct answer percentage to the last correct answer percentage, it does not seem reasonable to conclude that the current correct answer percentage indicates the understanding of the student. In addition, the "presented question" data in this record indicates that the examination questions for which the student's answer was correct in the last drill are additionally given in the drill that is currently being administered.

Next, in the record in the fifth row, the "condition" data indicates a case in which both of the following conditions E and F are satisfied. Here, the condition E is that a change in the current correct answer percentage from the last correct answer percentage is within 10% (the seventh rate of change). The condition F is that the current correct answer percentage has decreased by 20% or more from the second to the last correct answer percentage (the eighth rate of change). When both of these two conditions are satisfied, since the change in the current correct answer percentage from the last correct answer percentage is small despite an excessive decrease from the second to the last correct answer percentage to the last correct answer percentage, it does not seem reasonable to conclude that the current correct answer percentage indicates the understanding of the student. In addition, the "presented question" data in this record indicates that the examination questions for which the student's answer was correct in the second to the last drill are additionally being given in the drill that is currently being administered.

Next, in the record in the sixth row, the "condition" data indicates a case in which both of the following conditions G and H are satisfied. Here, the condition G is that a change in the current correct answer percentage from the last correct answer percentage is within 10% (the ninth rate of change). The condition H is that the current correct answer percentage has increased by 20% or more from the second to the last correct answer percentage (the tenth rate of change). When both of these two conditions are satisfied, since the change in the current correct answer percentage from the last correct answer percentage is small despite an excessive increase from the second to the last correct answer percentage to the last correct answer percentage, it does not seem reasonable to conclude that the current correct answer percentage indicates the understanding of the student. In addition, the "presented question" data in this record indicates that the examination questions for which the student's answer was incorrect in the second to the last drill are additionally being given in the drill that is currently being administered.

Lastly, in the record in the row in the condition DB57 illustrated in FIG. 4(b), the "condition" data indicates a case in which none of the conditions indicated by the "condition" data in each record from the first row to the sixth row in the above is met. In this record, the "presented question" data indicates that the examination questions for which the student's answers are incorrect in the current drill or the second to the last drill are additionally being given in the drill that is currently being administered. This record indicates a case in which all of the conditions in each record from the first row to the sixth row not being met is a case in which it is reasonable to conclude that the current correct answer percentage indicates the above-described understanding, and the record is for causing the student to review by giving the examination questions that the student answered incorrectly in the past.

It should be noted that in the present embodiment, when the condition DB 57 is referred to, each of the records is referred to in an order from the first row. Consequently, when the "condition" data in plural records are met, the "condition" data in the record which is referred to first has a priority over the others.

Next, the remaining-time administering drill table 58 is explained. The remaining-time administering drill table 58 is a table to manage the examination questions additionally given to the student in the currently administered drill. Note that the remaining-time administering drill table 58 is prepared for each of plural students, and the remaining-time administering drill table 58 for each student is identified by using the above-described "student ID" data assigned to each student. FIG. 4G is a diagram illustrating a data structure of the remaining-time administering drill table 58.

The remaining-time administering drill table 58 stores each piece of data including "category", "drill ID", "question ID", "correct/incorrect last time", "last answering time", "current answer", "correct/incorrect for current time", and "current answering time".

The "category" is data indicating a category to which the examination questions additionally given pertain. Note that this category is the same category as the category to which the drill that is currently being administered pertains.

The "drill ID" is identification information data of a drill in which examination questions additionally given in the currently administered drill were given in the past. Note that the "drill ID" data of the drill in which the additionally given examination questions were given in the past is extracted from the grade-by-category DB 56 based on the conditions indicated in the condition DB 57.

The "question ID" is identification information data of the examination questions additionally given in the drill that is currently being administered, and is assigned to the examination questions. Note that the "question ID" of the additionally given examination questions is extracted from the student answer DB 55 based on the "drill ID" data extracted from the grade-by-category DB 56 in the above-described manner.

In the remaining-time administering drill table 58, the "question ID" data is associated with each piece of data, including "correct/incorrect last time", "last answering time", "current answer", "correct/incorrect for current time", and "current answering time" on a one-to-one basis.

Here, "correct/incorrect last time" is data indicating whether the student's answer to the question identified by the "question ID" data was correct or incorrect when the question was given the last time, which is the most recent time. Note that in the example in FIG. 4G, a circle is displayed when the answer is correct and a cross is displayed when the answer is incorrect. The "last answering time" is data indicating a time (by minutes in this example) needed to obtain an answer and input (select) the answer in the student terminal from a time when the student starts to address the question that is identified by the "question ID" when the question was given the last time, which is the most recent time. Note that each piece of data in the "correct/incorrect last time" and "last answering time" is extracted together with the above-described "question ID" from the student answer DB 55 based on the "drill ID" data extracted from the grade-by-category DB 56 in the above-described manner.

In addition, the "current answer" is data indicating the student's answer (information specifying one of four choices) to the question that is additionally being given in the currently administered drill and is identified by the "question ID". "correct/incorrect for current time" is data indicating whether the student's answer indicated by the "current answer" data is correct or incorrect. Note that in this example of FIG. 4G, a circle is displayed when the answer is correct and a cross is displayed when the answer is incorrect. The "current answering time" is data indicating a time (by minutes in this example) needed to obtain an answer from a time when the student starts to address the question that is identified by the "question ID" and is additionally being given in the currently administered drill.

It should be noted that in the present embodiment, when the remaining-time administering drill table 58 is referred to, each of the records is referred to in an order from the first row.

Next, the received question table 62 is explained. The received question table 62 is a table used to manage data of the examination questions transmitted from the teacher terminal 50 to the student terminal 60 when the drill is administered. FIG. 4H is a diagram illustrating a data structure of the received question table 62.

The received question table 62 stores each piece of data, including "drill ID", "question ID", "question", "choice 1", "choice 2", "choice 3", "choice 4", and "correct answer". Of these pieces of data, all of the "drill ID", "question ID", "question", "choice 1", "choice 2", "choice 3", "choice 4" and "correct answer" is corresponding data transmitted from the teacher terminal 50.

Each of the various databases and data tables presented in FIG. 3 has the above-described data structure.

It should be noted that in the configuration in FIG. 3, an operation terminal that a teacher operates may be added and connected to the LAN 70, and the teacher terminal 50 is driven as a server computer system connected to the LAN 70 so that various instructions to the teacher terminal 50 may be made from this operation terminal. In addition, exchange of various data between the teacher terminal 50 driven as a server computer system and the LAN 70 may be performed via a separate communication network such as the Internet.

Figure 5A:
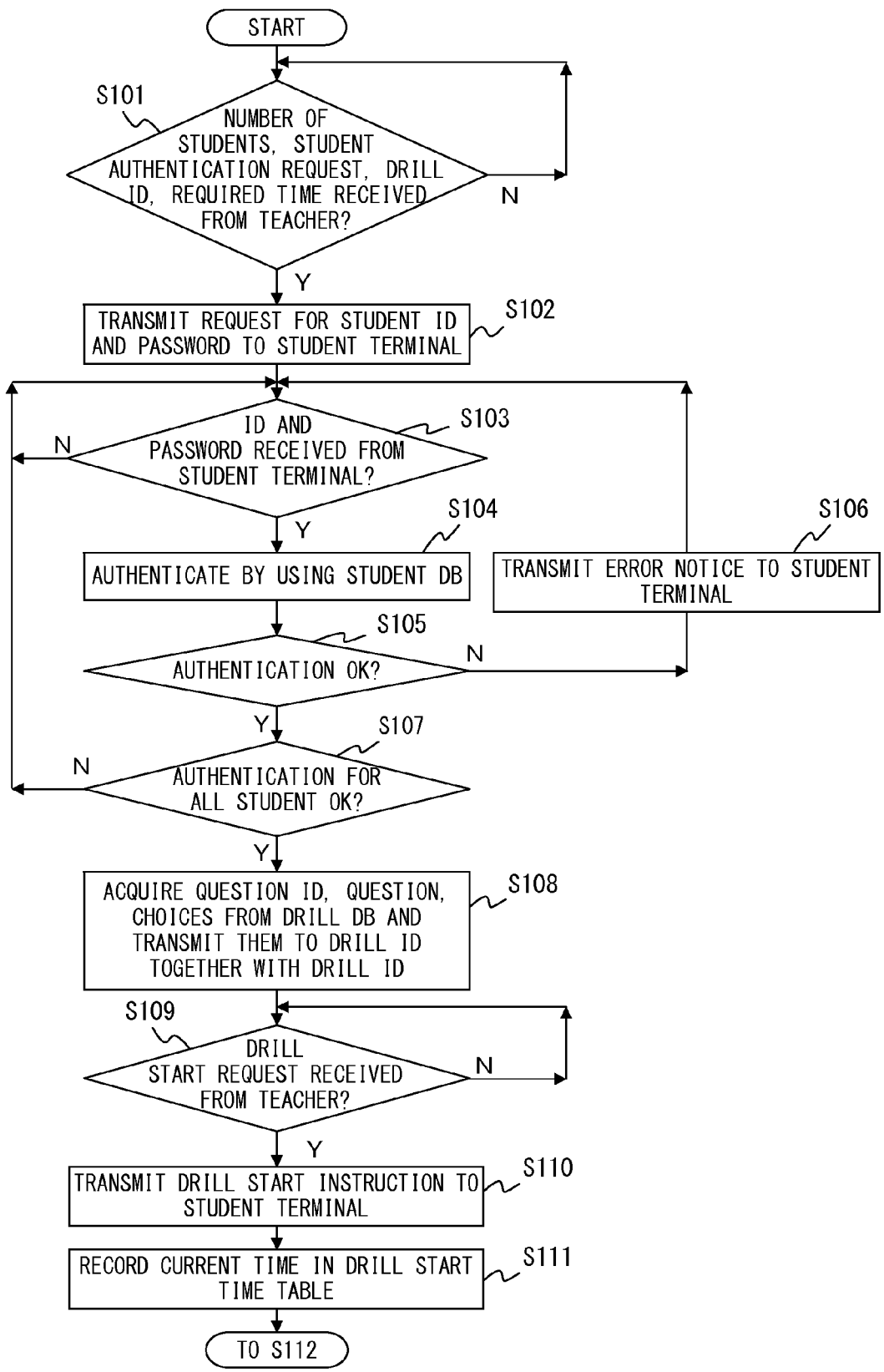
FIG. 5A is a flowchart (1) illustrating details of processing in drill administering control processing.
Figure 5B:
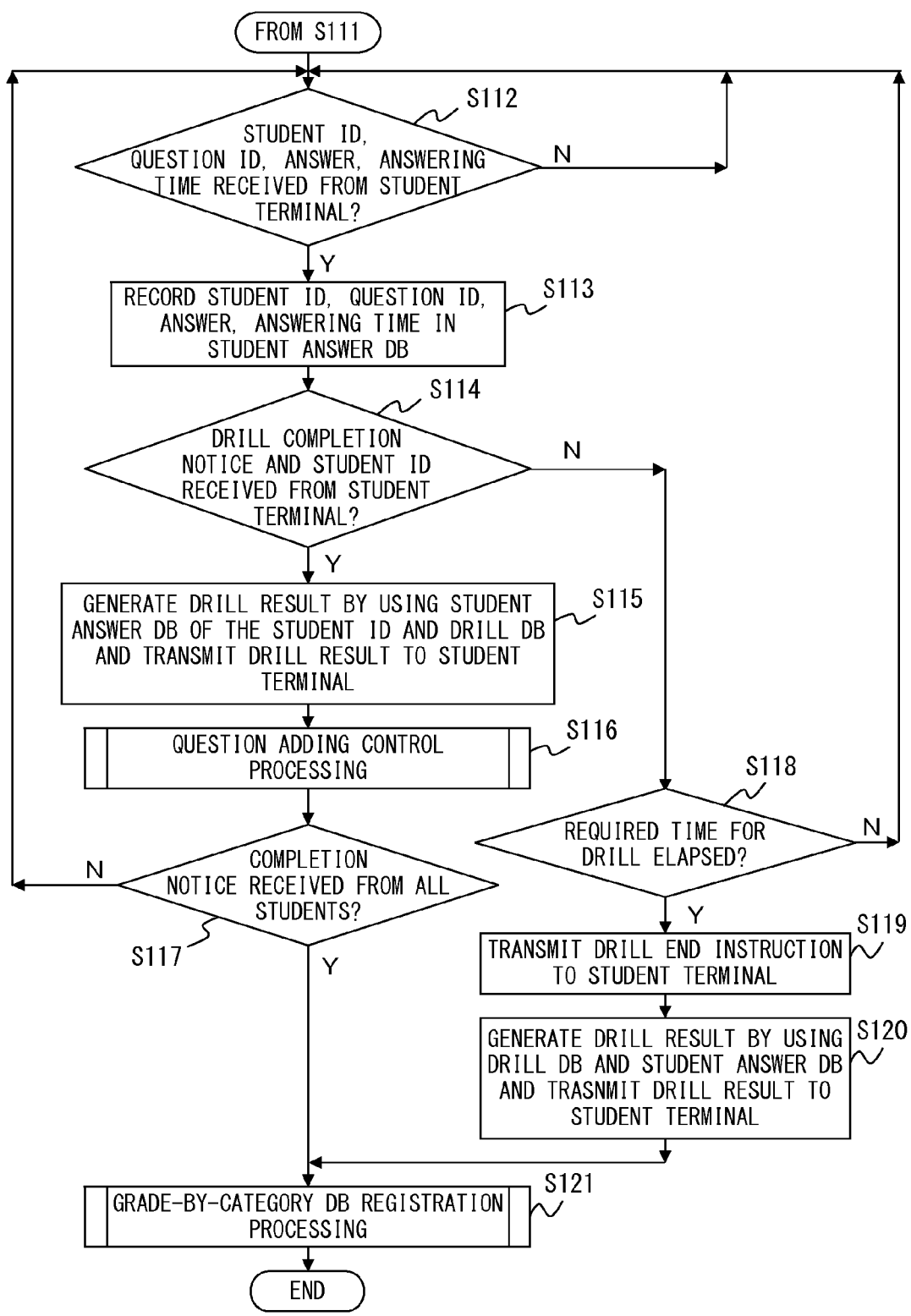
FIG. 5B is a flowchart (2) illustrating details of processing in drill administering control processing.

Next, the drill administering control processing performed in the teacher terminal 50 is explained. FIG. 5A and FIG. 5B are flowcharts illustrating details of processing in this drill administering control processing.

This drill administering control processing is performed by the MPU 31 in the computer 30 driven as the teacher terminal 50. When a prescribed execution start instruction is made by a teacher operating the input device 35 in the teacher terminal 50, the MPU 31 reads out and executes a drill administering program 51 in the storage device 34. Then the MPU 31 starts the drill administering control processing.

First, in S101, the MPU 31 performs processing to determine whether or not each piece of information including the number of students, a student authentication request, a drill ID of a drill to be administered, and a required time for the drill, which are input by a teacher by operating the input device 35 of the teacher terminal 50, have been received. Here, the MPU 31 moves the processing to S102 when it determines that these pieces of information have been received (when the determination result is Yes). On the other hand, here, when the MPU 31 determines that these pieces of information have not been received yet (when the determination result is No), the MPU 31 repeats processing in S101 until reception of these pieces of information is detected.

Next, in S102, the MPU 31 performs processing to cause the LAN 70 to transmit a request for a student ID and a password addressed to each student terminal 60 by controlling the interface device 37.

Next, in S103, the MPU 31 performs processing to determine whether or not the interface device 37 received, from the LAN 70, data of the student ID and the password transmitted from the student terminal 60 in response to the request transmitted in the processing in S102. Here, when the MPU 31 determines that the interface device 37 received these pieces of data (when the determination result is Yes), the MPU 31 moves the processing to S103. On the other hand, here, when the MPU 31 determines that the interface device 37 has not yet received these pieces of data (when the determination result is No), the MPU 31 repeats processing in S103 until reception of these pieces of data is detected.

Next, in S104, the MPU 31 performs authentication processing of the received data of the student ID and the password by using the student DB 52. In the subsequent S105, the MPU 31 performs processing to determine whether or not this authentication processing has resulted in authentication succeeded. The determination in this determination processing is made by determining whether or not a combination of the student ID and the password in the received data is present in any of records stored in the student DB 52. The MPU 31, here, moves the processing to S107 when the MPU 31 determines that the authentication processing resulted in authentication succeeded (when the determination result is Yes). On the other hand, here, when the MPU 31 determines that the authentication processing resulted in authentication failed (when the determination result is No), the MPU 31 moves the processing to step S106.

Next, in S106, The MPU 31 performs processing to cause the LAN 70 to transmit a prescribed error notice addressed to the student terminal 60, which is a transmission source of a combination of the student ID and the password for which an authentication that has resulted in authentication failed is obtained, by controlling the interface device 37.

Next, in S107, the MPU 31 performs processing to determine whether or not the authentication processing in S104 has resulted in authentication succeeded for all student terminals 60 connected to the teacher terminal 50 via the LAN 70. The MPU 31, here, moves the processing to S108 when the MPU 31 determines that the authentication processing resulted in authentication succeeded for all student terminal 60 (when the determination result is Yes). On the other hand, here, when the MPU 31 determines that there remains a student terminal 60 for which the authentication processing resulted in authentication failed (when the determination result is No), the MPU 31 returns the processing to S103. The MPU 31 then continues processing to receive new data of a student ID and a password transmitted from the student terminal 60 of the failed authentication.

Next, in S108, firstly, the MPU 31 performs processing to read out data of a question ID and a question and each piece of data from choice 1 to choice 4 for each of the examination questions pertain to the drill ID of a drill that a teacher was instructed to administer by referring to the drill DB 53. Afterwards, the MPU 31 performs processing to cause the LAN 70 to transmit the drill ID and these pieces of read data addressed to each student terminal 60 by controlling the interface device 37.

It should be noted that the MPU 31 and the interface device 37 that perform the processing in S108 function as the question output unit 12 in the examination support apparatus 1 in FIG. 1.

Next, in S109, the MPU 31 performs processing to determine whether or not a prescribed drill start instruction, which is input by the teacher by operating the input device 35 of the teacher terminal 50, has been received. The MPU 31, here, moves the processing to S110 when the MPU 31 determines that the drill start instruction has been received (when the determination result is Yes). On the other hand, here, when the MPU 31 determines that the drill start instruction has not been received (when the determination result is No), the MPU 31 repeats the processing in S109 until reception of the drill start instruction is detected.

Next, in S110, the MPU 31 performs processing to cause the LAN 70 to transmit a prescribed drill start instruction addressed to each student terminal 60 by controlling the interface device 37.

Next, in S111, the MPU 31 performs processing to obtain date and time data of a point in time at which this processing is executed from a clock by referring to the clock, which is not illustrated, provided in the MPU 31 itself, and to store the obtained date and time data in the year-month-day and start time data in the drill start time table 54.

The processing moves on to processing in FIG. 5B, and in S112, the MPU 31 performs processing to cause the interface device 37 to receive each piece of data, including a student ID, a question ID, an answer, and an answering time, which are transmitted from a transmission source of any of the student terminals 60 via the LAN 70. The MPU 31 performs processing to determine whether or not these pieces of data are received in the interface device 37. Here, the answer data indicates the answer of a student who is a user of the student terminal 60 for the question identified by the question ID, and the answering time data indicates a time needed to obtain an answer from a time when the student starts to address the question. The MPU 31, here, moves the processing to S113 when the MPU 31 determines that the interface device 37 receives these pieces of data (when the determination result is Yes). On the other hand, here, when the MPU 31 determines that the interface device 37 has not yet received these pieces of data (when the determination result is No), the MPU 31 repeats the processing in S112 until reception of these pieces of data is detected.

It should be noted that the MPU 31 and the interface device 37 that perform the processing in S112 function as the answer acquisition unit 13 in the examination support apparatus 1 in FIG. 1.

Next, in S113, The MPU 31 performs processing to add and store the record including each piece of data including the question ID, the answer, and the answering time of the received data in the student answer DB 55 identified by the student ID data of the received data. Note that in this record, data of the drill that the teacher gave instructions to administer is given to the "drill ID" and data identical with the year-month-day data stored in the drill start time table 54 is stored in the "drill administering date". For the "category" of this record, a category of the record from which the examination question data is read out in the processing in S108 (FIG. 5A) in the drill DB 53 is given.

Next, in S114, the MPU 31 performs processing to determine whether or not the interface device 37 received from the LAN 70 data of a prescribed drill completion notice and the student ID transmitted from a transmission source of any of the student terminals 60. The MPU 31, here, moves the processing to S115 when the MPU 31 determines that the interface device 37 received these pieces of data (when the determination result is Yes). On the other hand, here, when the MPU 31 determines that the interface device 37 has not yet received these pieces of data (when the determination result is No), the MPU 31 moves the processing to S118.

Next, in S115, the MPU 31 performs the following processing.

The MPU 31, firstly, performs correct/incorrect determination processing of answer data associated with the question ID held in the student answer DB 55 identified by the student ID data, which is determined to be received in the determination processing in S114. Note that this correct/incorrect determination is performed by determining whether or not the answer data matches correct answer data stored in association with the question ID in the drill DB 53, and the determination result is stored as correct/incorrect data in the student answer DB 55. The MPU 31, next, performs read-out processing of the question data associated with the question ID from the drill DB 53. Afterwards, the MPU 31 performs processing to cause the LAN 70 to transmit each piece of data including the question ID, the question, the answer, and the correct answer, and the result of the correct/incorrect determination, which are addressed to the student terminal 60 of the transmission source of the drill completion notice data. These pieces of transmission data are transmitted to the student terminal 60 as a result of the drill.

The MPU 31 performs the above processing in S115. Note that the MPU 31 that performs the processing in S115 functions as the correct/incorrect determination unit 14 in the examination support apparatus 1 in FIG. 1.

Next, in S116, the MPU 31 performs question adding control processing for the student terminal 60, which is a transmission source of date of the drill completion notice and the student ID determined to be received in the determination processing in S114. Details of the question adding control processing are described later.

Next, in S117, the MPU 31 performs processing to determine whether or not the interface device 37 received the above-described drill completion notice data from all student terminals 60 connected to the teacher terminal 50 via the LAN 70. The MPU 31, here, moves the processing to S121 when the MPU 31 determines that the drill completion notice data has been received from all of the student terminals 60 (when the determination result is Yes). On the other hand, here, when the MPU 31 determines that there remains a student terminal 60 to which the drill completion notice data for the interface device 37 has not been transmitted (when the determination result is No), the MPU 31 returns the processing to S112. The MPU 31 repeats the processing in S112 and its subsequent processing until the drill completion notice data is received from all of the student terminals 60.

Next, in S118, the MPU 31 performs the following processing.

The MPU 31 firstly performs processing to read out the start date and time of a drill that is currently being administered from the drill start time table 54, and processing to calculate a time elapsed from the start date and time by referring to the above-described clock, which is not illustrated, and obtaining the date and time data of the point in time at which this processing is performed from the clock. The MPU 31 performs processing to determine whether or not the required time for the drill, reception of which was detected in the processing in S101 in FIG. 5A, has elapsed. The MPU 31, here, moves the processing to S119 when the MPU 31 determines that the elapsed time has already exceeded the required time (when the determination result is Yes). On the other hand, here, when the MPU 31 determines that the elapsed time has not yet exceeded the required time (when the determination result is No), the MPU 31 returns the processing to S112. The MPU 31 repeats the processing in S112 and its subsequent processing until the elapsed time exceeds the required time.

The MPU 31 performs the above processing in S118.

Next, in S119, the MPU 31 performs processing to cause the LAN 70 to transmit a prescribed drill end instruction addressed to each student terminal 60 by controlling the interface device 37.

Next, in S120, the MPU 31 performs the following processing.

The MPU 31, first, performs correct/incorrect determination processing of the answer data, which is held in all student answer DBs 55 and associated with the question ID. Note that this correct/incorrect determination is performed by determining whether or not the answer data matches correct answer data stored in association with the question ID in the drill DB 53. The determination result is stored in the correct/incorrect data in the student answer DB 55. The MPU 31, next, performs processing to read the question data associated with the question ID from the drill DB 53. Afterwards, the MPU 31 performs processing to cause the LAN 70 to transmit the result of the correct/incorrect determination addressed to the student terminal 60 that a student identified by the student ID associated with student answer DB 55 uses. Note that at that time, each piece of data including the question ID, the question, the answer, and the correct answer is transmitted together with transmission of the result of the correct/incorrect determination.

The MPU 31 performs the above processing in S120. Note that the MPU 31 that performs the processing in S120 functions as the correct/incorrect determination unit 14 in the examination support apparatus 1 in FIG. 1.

Next, in S121, the MPU 31 performs grade-by-category DB registration control processing, which is processing to register the correct answer percentage of each student for the administered drill in the grade-by-category DB 56. Details of this grade-by-category DB registration control processing are described later. When this processing in S121 is finished, the drill administering control processing is finished.

The processing described above is the drill administering control processing.

Figure 6A:
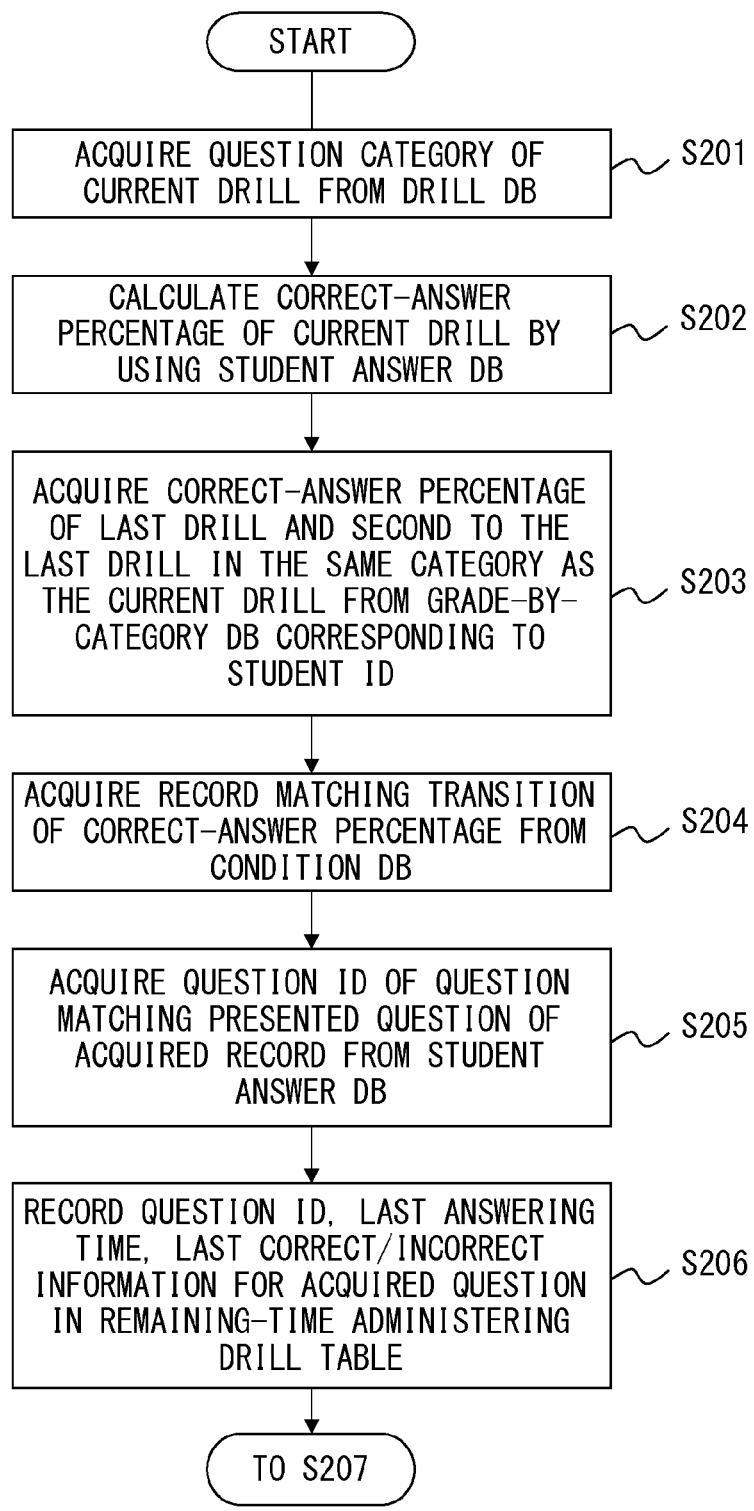
FIG. 6A is a flowchart (1) illustrating processing contents of question adding control processing.
Figure 6B:
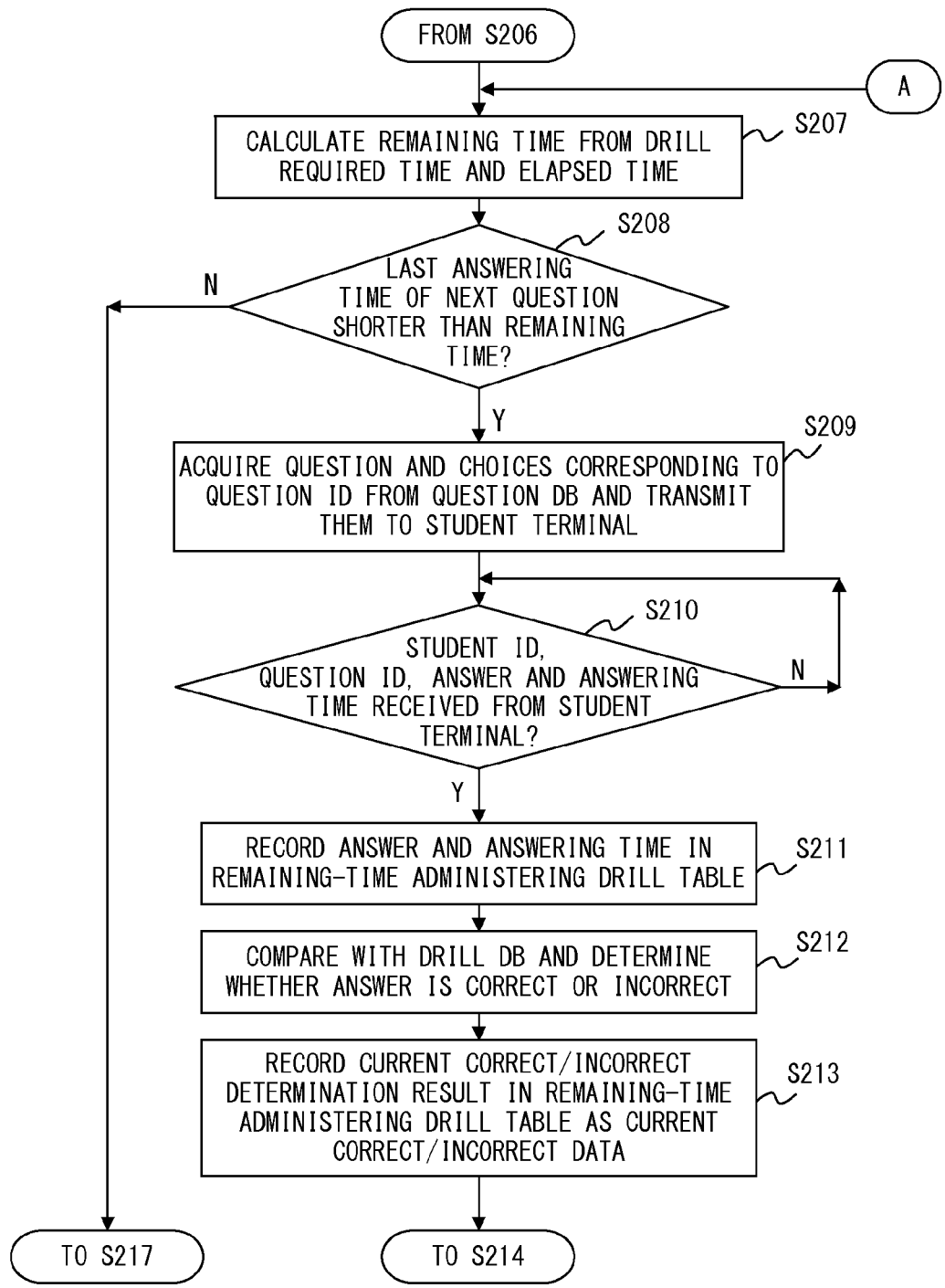
FIG. 6B is a flowchart (2) illustrating processing contents of question adding control processing.
Figure 6C:
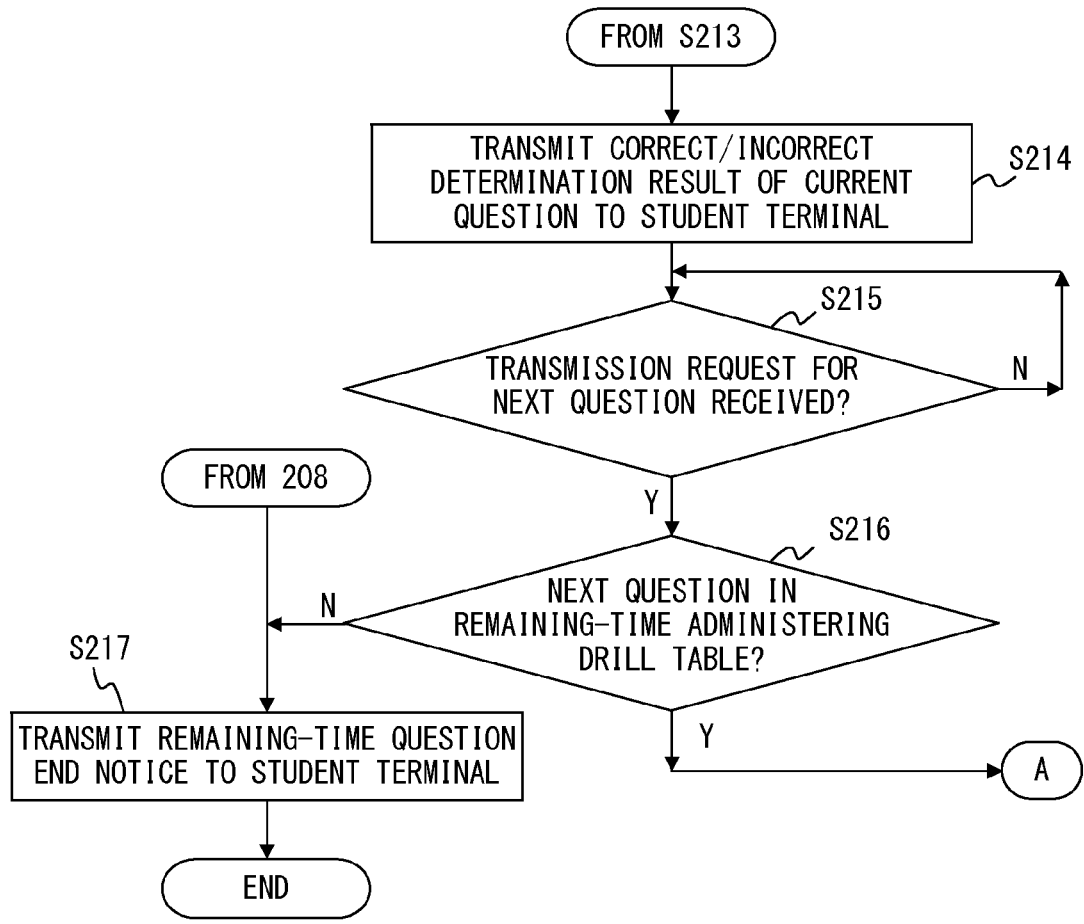
FIG. 6C is a flowchart (3) illustrating processing contents of question adding control processing.

Next, details of the question adding control processing are explained, which is processing in S116 in the above-described drill administering control processing in FIG. 5A and FIG. 5B. FIG. 6A, FIG. 6B, and FIG. 6C are flowcharts illustrating processing contents of the question adding control processing.

In FIG. 6A, in S201, the MPU 31 performs processing to obtain the category to which the drill ID of the drill that a teacher gave instructions to administer pertains by referring to the drill DB 53.

Next, in S202, the MPU 31 performs processing to refer to the student answer DB 55 identified by the student ID received in the determination processing in S114 (FIG. 5B), to count correct/incorrect data held in the student answer DB 55, and obtains the number of questions given in the currently administered drill and the number of correct answers. The MPU 31 performs processing to calculate the correct answer percentage in the currently administered drill for each student by dividing the number of correct answers by the number of the given questions. The correct answer percentage, which is calculated in this processing, is the above-described current correct answer percentage.

It should be noted that the MPU 31 that performs this processing in S206 functions as the calculation unit 15 in the examination support apparatus 1 in FIG. 1.

Next, in S203, the MPU 31 performs processing to obtain the correct answer percentage in the drill which was administered in the past and pertains to the same category as the category obtained in the processing in S201, by referring to the grade-by-category DB 56 identified by the student ID received in the determination processing in S114 (FIG. 5B). Of the correct answer percentage obtained in this processing, the correct answer percentage of the drill administered the last time before the current drill is the last correct answer percentage, and the correct answer percentage of the drill administered the second to the last time before the current drill is the second to the last correct answer percentage.

Next, in S204, the MPU 31 performs processing to obtain a record that matches the transition of correct-answer percentages obtained in the processing in S201 and S203 by referring to each record in the condition DB 57 in the above-described order.

The MPU 31 that performs this processing in S204 functions as a determination unit 16 in the examination support apparatus 1 in FIG. 1. On the other hand, the MPU 31 provides a function of the question output unit 12 in the examination support apparatus 1 in FIG. 1 by performing the processing from S205 to S209 in FIG. 6B, which is explained in the following description.

Next, in S205, the MPU 31 performs processing to refer to the grade-by-category DB 56, which is the same grade-by-category DB 56 as the one in the processing in S203, one more time, and to obtain the drill ID of the drill for which the last correct answer percentage and the second to the last correct answer percentage are obtained. Next, the MPU 31 performs processing to refer to the student answer DB 55, which is the same student answer DB 55 as the one in the processing in S202, one more time, and to obtain the question ID for which the correct/incorrect data matches the presented question of the record obtained in the processing in S204 from among the examination questions pertaining to the obtained drill ID.

Next, in S206, the MPU 31 performs processing to further refer to the student answer DB 55, which is the same student answer DB 55 as the one in the processing in S202, and to obtain the correct/incorrect data and the answering time data associated with the question ID obtained in the processing in S204 and the drill ID to which the question ID pertains. Next, the MPU 31 associates the obtained drill ID with the category obtained in the processing in S201 by referring to the remaining-time administering drill table 58, and to record each piece of the obtained data including the question ID, whether it was correct/incorrect, and the answering time in association with the drill ID. Note that these pieces of correct/incorrect data and answering time data are recorded as the last correct/incorrect data and the last answering time data, respectively, in the remaining-time administering drill table 58.

The processing moves on to processing in FIG. 6B, and in S207, the MPU 31 performs the following processing.

The MPU 31, first, performs processing to read out the start date and time of the currently administered drill from the drill start time table 54 and to calculate a time elapsed from the start date and time by referring to the above-described clock, which is not illustrated, and obtaining the date and time data of the point in time at which this processing is performed from the clock. The MPU 31, next, performs processing to calculate a remaining time for the currently administered drill by subtracting a calculated value of the elapsed time from the required time for the currently administered drill, reception of which was detected in the processing in S101 in FIG. 5A.

The MPU 31 performs the above processing in S207.

Next, in S208, the MPU 31 performs processing to determine whether or not the time indicated by the last answering time data of the record is shorter than the remaining time calculated in the processing in S207 by referring to one of the records in the remaining-time administering drill table 58 in the above-described order. When the MPU 31, here, determines that the time indicated in the last answering time data is shorter than the remaining time and that there is spare time for answering the examination questions identified in the record (when the determination result is Yes), the MPU 31 moves the processing to S209. On the other hand, here, when the MPU 31 determines that the time indicated in the last answering time data is equal to or longer than the remaining time and that there is no spare time for answering the examination questions identified in the record (when the determination result is No), the MPU 31 moves the processing to S217.

Next, in S209, the MPU 31 performs processing, by referring to the drill DB 53 first, to read out the question data, each piece of data including choice 1 to choice 4, and the correct answer data, which are associated with the question ID of the record in the remaining-time administering drill table 58 referred to in the processing in S208. The MPU 31 performs processing to cause the LAN 70 to transmit these pieces of read data together with the question ID to the student terminal 60, which is a transmission source of the student ID, reception of which is detected in the determination processing in S114 (FIG. 5B) by controlling the interface device 37.

Next, in S210, the MPU 31 performs processing to cause the interface device 37 to receive each piece of data including the student ID, the question ID, the answer, and the answering time, which are transmitted via the LAN 70 from the student terminal 60 that is the destination of each piece of data in the processing in S209. The MPU 31 performs processing to determine whether or not these pieces of data are received in the interface device 37. Here, the answer data represents an answer by the examinee, who is a user of the student terminal 60, to the question identified by the question ID, and the answering time data represents a time needed to obtain the answer from a time when the student starts to address the question. The MPU 31, here, moves the processing to S211, when the MPU 31 determines that the interface device 37 received these pieces of data (when the determination result is Yes). On the other hand, here, when the MPU 31 determines that the interface device 37 has not yet received these pieces of data (when the determination result is No), the MPU 31 repeats the processing in S210 until reception of these pieces of data is detected.

Next, in S211, the MPU 31 performs processing to store each piece of data including the answer and the answering time of the data, reception of which was detected in the processing in S210, in the record (record including the received question ID) of the remaining-time administering drill table 58, which was referred to in the processing in S208. Note that the answer data and the answering time data are recorded in the remaining-time administering drill table 58 as the current answer data and the current answering time data, respectively.

Next, in S212, the MPU 31 performs processing to determine whether the answer data, reception of which is detected in the processing in S210, is correct or incorrect. Note that this correct/incorrect determination is made by determining whether or not the answer data matches the correct answer data stored in the drill DB 53 in association with the question ID, reception of which is detected in the processing in S210.

Next, in S213, the MPU 31 performs processing to store the result of the correct/incorrect determination processing in S212 as the current correct/incorrect data in the remaining-time administering drill table 58.

The processing moves on to processing in FIG. 6C, and in S214, the MPU 31 performs processing to cause the LAN 70 to transmit the result of the correct/incorrect determination processing in S212 addressed to the student terminal 60, which is the transmission source of the question ID, reception of which is detected in processing in S210, by controlling the interface device 37.

Next, in S215, the MPU 31 performs processing to determine whether or not the interface device 37 received a transmission request of the next question from the student terminal 60 that transmitted the result of the correct/incorrect determination processing in the processing in S214. The MPU 31, here, moves the processing to S216, when the MPU 31 determines that the transmission request of the next question has been received (when the determination result is Yes). On the other hand, when the MPU 31 determines that the transmission request of the next question has not yet been received (when the determination result is No), the MPU 31 repeats the processing in S215 until the request is received.

Next, in S216, the MPU 31 performs processing to determine whether or not any record of the next order following the record that has been referred to is remaining in the remaining-time administering drill table 58. The MPU 31, here, returns the processing to the processing in S207 and performs processing in S207 on the record of the order when the MPU 31 determines that the record of the next order is remaining (when the determination result is Yes). On the other hand, here, when the MPU 31 determines that there is no record of the next order (when the determination result is No), the MPU 31 moves the processing to S217.

Next, in S217, the MPU 31 performs processing to cause the LAN 70 to transmit an instruction to terminate administering the examination questions added in the remaining time, which is addressed to the student terminal 60, which is a transmission source of the student ID, reception of the instruction being detected in the determination processing in S114 (FIG. 5B), by controlling the interface device 37. When this processing is terminated, the question adding control processing is terminated.

The processing described above is the question adding control processing.

Figure 7:
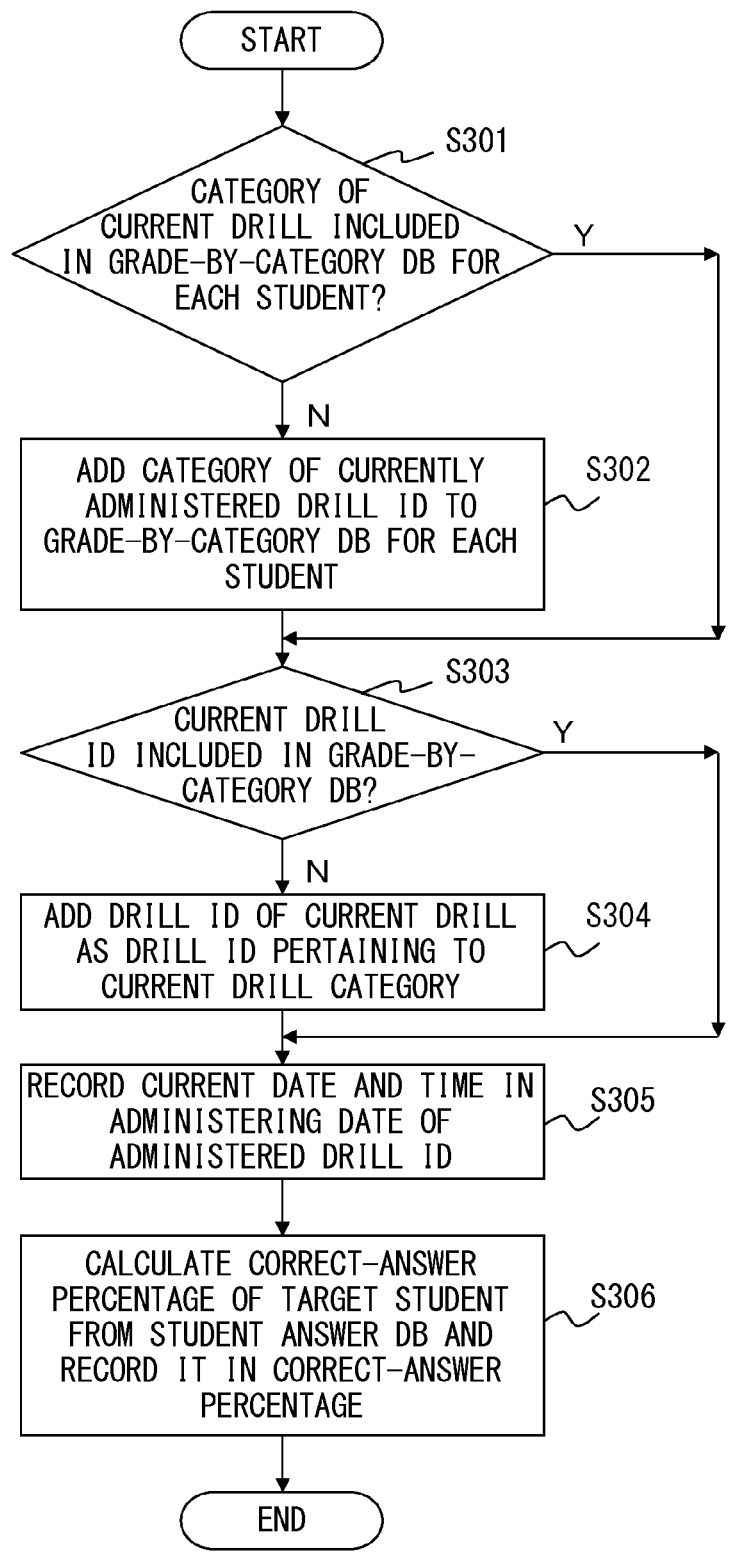
FIG. 7 is a flowchart illustrating processing contents of grade-by-category DB registration control processing.

Next, details of grade-by-category DB registration control processing, which is processing in S121 in the above-described drill administering control processing, are explained. FIG. 7 is a flowchart illustrating the processing contents of the grade-by-category DB registration control processing.

In FIG. 7, in S301, first, the MPU 31 performs processing to determine whether or not a category of the drill that is currently being administered is included in the grade-by-category DB 56 of each student. Note that the category of the currently administered drill is a category to which the record from which the data of the examination questions is read out in the processing in S108 in FIG. 5A pertains in the drill DB 53. The MPU 31, here, moves the processing to S303 for the grade-by-category DB 56 that includes the category (when the determination result is Yes). On the other hand, the MPU 31 moves the processing to S302 for the grade-by-category DB 56 that does not include the category (when the determination result is No).

Next, in S302, the MPU 31 performs processing to add the category of the currently administered drill to the grade-by-category DB 56.

Next, in S303, the MPU 31 performs processing to determine whether or not the drill ID of the currently administered drill is included in the grade-by-category DB 56 of each student. Here, the MPU 31 moves the processing to S305 for the grade-by-category DB 56 including the drill ID (when the determination result is Yes). On the other hand, the MPU 31 moves the processing to S304 for the grade-by-category DB 56 that does not include the drill ID (when the determination result is No).

Next, in S304, the MPU 31 performs processing to add the drill ID of the currently administered drill to the grade-by-category DB 56 as a drill ID that pertains to the category of the currently administered drill.

Next, in S305, the MPU 31 performs processing to add the record including the data of the administering date of the currently administered drill as a record that pertains to the drill ID of the drill in the grade-by-category DB 56.

Next, the MPU 31 performs the following processing in S306.

The MPU 31, first, refers to the student answer DB 55 of each student, counts correct/incorrect data held in the student answer DB 55, and performs processing to obtain the number of given questions and the number of correct answers of the currently administered drill. Next, the MPU 31 performs processing to calculate the correct-answer percentage of the currently administered drill for each student by dividing the number of correct answers by the number of given questions. Afterwards, the MPU 31 performs processing to store the correct-answer percentage calculated for each student in the grade-by-category DB 56 as correct-answer percentage data in the record added in the processing in S305.

The MPU 31 performs the above processing in S306. Note that the MPU 31 performing this processing in S306 functions as the calculation unit 15 in the examination support apparatus 1 in FIG. 1. When this processing in S306 is terminated, the grade-by-category DB registration control processing is terminated. The processing described above is the grade-by-category DB registration control processing.

Figure 8A:
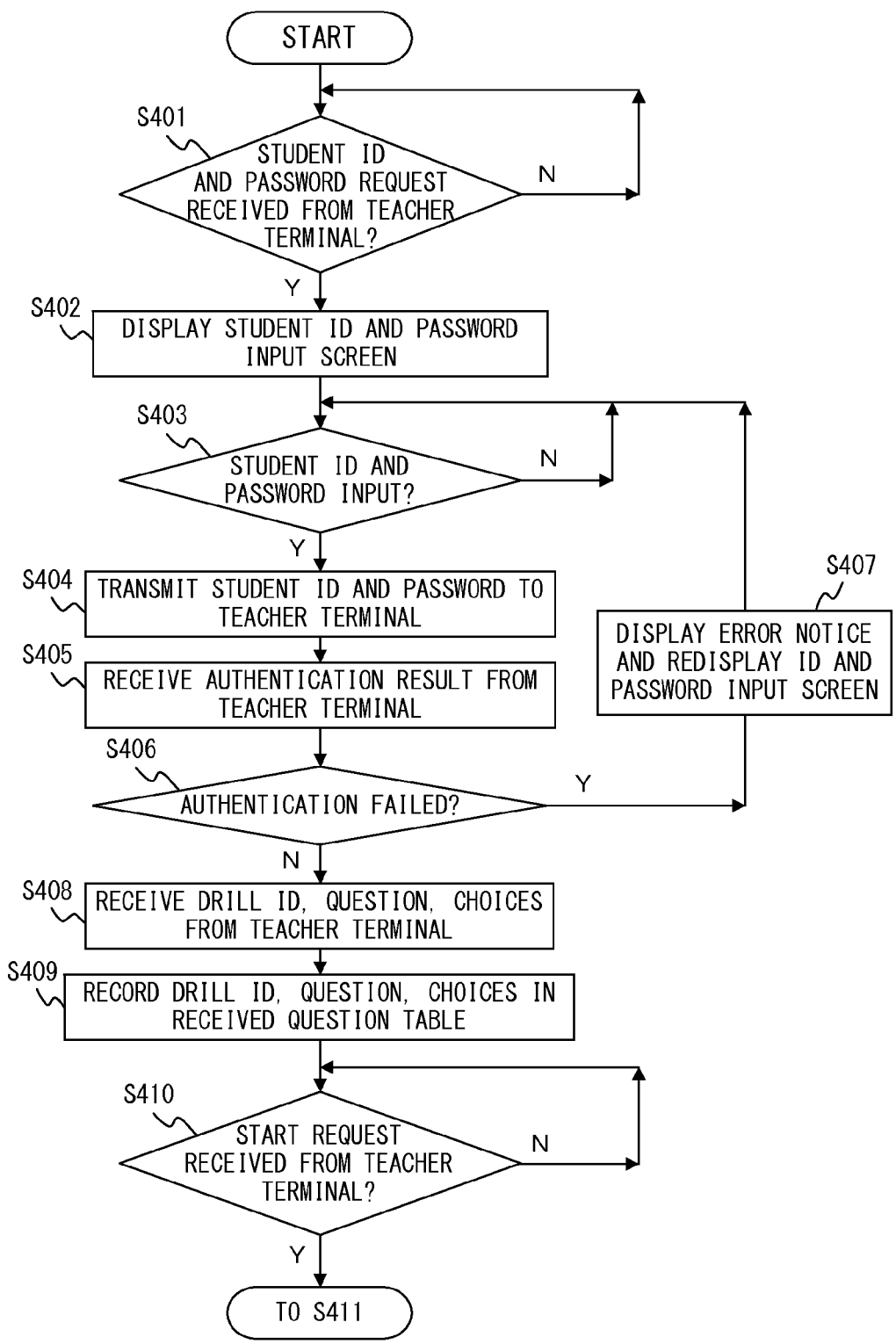
FIG. 8A is a flowchart (1) illustrating processing contents of drill participation control processing.
Figure 8B:
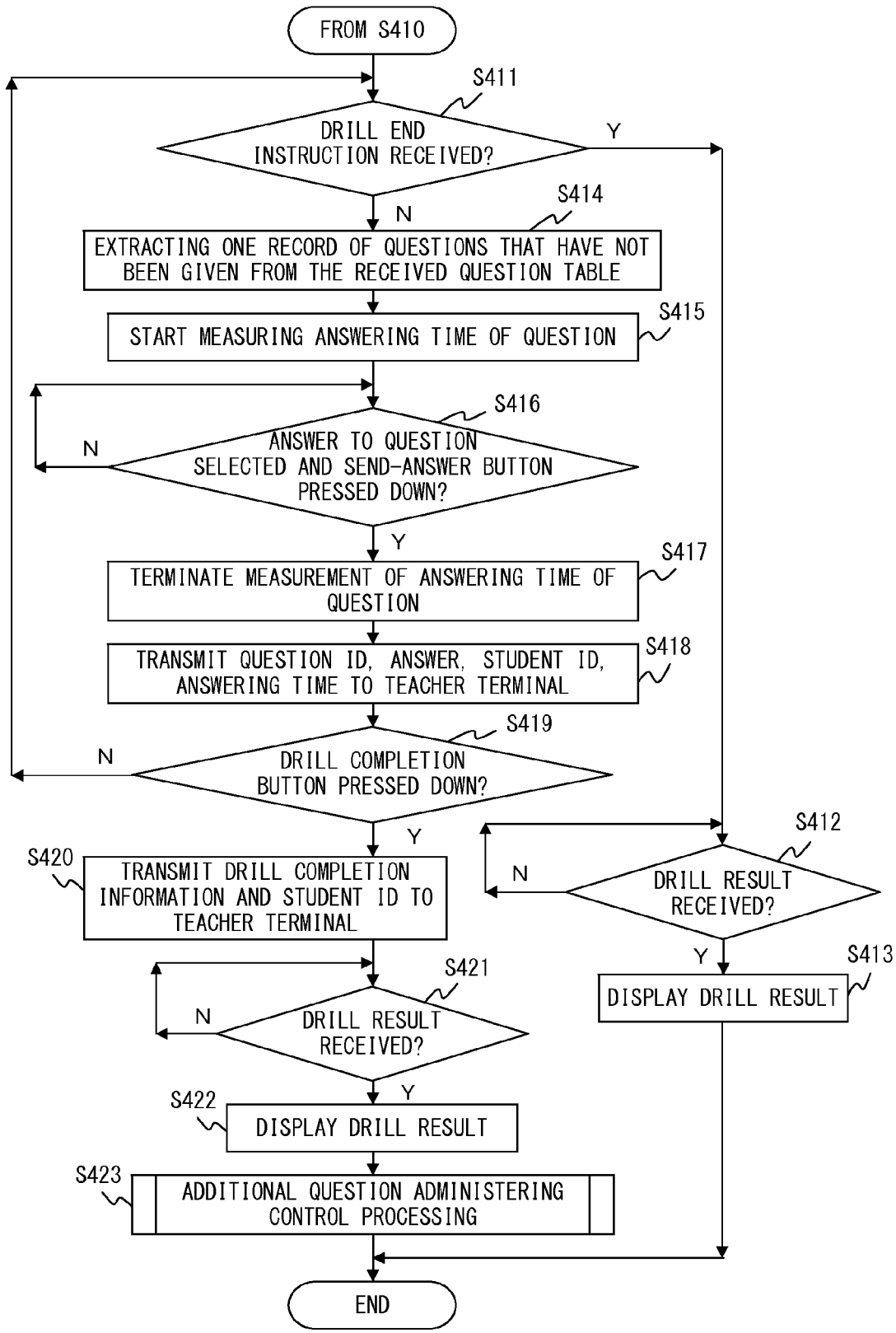
FIG. 8B is a flowchart (2) illustrating processing contents of drill participation control processing.

Next, the drill participation control processing performed in the student terminal 60 is explained with reference to FIG. 8A and FIG. 8B. FIG. 8A and FIG. 8B are flowcharts illustrating the processing contents of the drill participation control processing.

The drill participation control processing is processing to transmit answers obtained by the student to the examination questions given in the drill administered by the teacher terminal 50 in which the above-described drill administering control processing is performed, and to present the result of the drill including correctness/incorrectness of the answers to the student.

This drill participation control processing is performed by the MPU 31 of the computer 30, which functions as a student terminal 60. When the MPU 31 detects that a prescribed execution start instruction has been made by a student operating the input device 35 of the student terminal 60, the MPU 31 reads out and executes the drill participation program 61 in the storage device 34. Then the MPU 31 starts this drill participation control processing.

In FIG. 8A, in S401, first, the MPU 31 performs processing to determine whether or not the interface device 37 received from the LAN 70 a request of a student ID and a password transmitted from the teacher terminal 50 that performed the processing in S102 in FIG. 5A. The MPU 31, here, moves the processing to S402 when the MPU 31 determines that the interface device 37 received request (when the determination result is Yes). On the other hand, the MPU 31 repeats the processing in S401 until reception of the request is detected when the MPU 31 determines that the interface device 37 has not yet received the request (when the determination result is No).

Next, in S402, the MPU 31 performs processing to cause the display device 36 of the student terminal 60 to display an input screen that encourages a student to input the student ID and the password.

Next, in S403, the MPU 31 performs processing to determine whether or not the input device 35 of the student terminal 60 detects an input of the student ID and the password in response to the display on the input screen resulting from the processing in S402. The MPU 31, here, moves the processing to S404 when the MPU 31 determines that the input of the student ID and the password was detected (when the determination result is Yes). On the other hand, the MPU 31 repeats the processing in S403 until the input is detected when the MPU 31 determines that the input of the student ID and the password has not yet been detected (when the determination result is No).

In S404, the MPU 31 performs processing to cause the LAN 70 to transmit the student ID and the password, of which an input to the input device 35 is detected, addressed to the teacher terminal 50 by controlling interface device 37 of the student terminal 60.

Next, in S405, the MPU 31 performs processing to receive, via the LAN 70, a result of authentication processing transmitted from the teacher terminal 50 in response to the transmission of the student ID and the password resulting from the processing in S404 by controlling the interface device 37 of the student terminal 60.

Next, in S406, the MPU 31 performs processing to determine whether or not the result received in the processing in S405 is that authentication processing has failed (i.e., whether or not the above-described error notice is received). Here, when the MPU 31 determines that the authentication result indicating that authentication has failed was received (when the determination result is Yes), the MPU 31 moves the processing to S407. On the other hand, when the MPU 31 determines that an authentication result indicating the authentication failed has not been received (when the determination result is No), the MPU 31 moves the processing to S408.

Next, in S407, the MPU 31 performs processing to cause the display device of the student terminal 60 to display a prescribed error notice screen and to cause the display device 36 to redisplay the above-described input screen that encourages the student to input the student ID and the password. Afterwards, when this processing in S407 is terminated, the MPU 31 returns the processing to S403 and performs the above-described processing once again.

Next, in S408, the MPU 31 performs processing to receive via the LAN 70 various pieces of data transmitted from the teacher terminal 50 that performed the processing in S108 in FIG. 5A by controlling the interface device 37 of the student terminal 60. Note that the data received in this processing is data including a drill ID, a question ID, a question, and each piece of data including a choice 1 to a choice 4.

Next, in S409, the MPU 31 performs processing to store data including the drill ID, the question ID, the question, and each piece of data including the choice 1 to the choice 4 in the received question table 62.

Next, in S410, the MPU 31 performs processing to determine whether or not the interface device 37 of the student terminal 60 received the drill start instruction transmitted from the teacher terminal 50 that performed the processing in S110 in FIG. 5A. The MPU 31, here, moves the processing to S411 (FIG. 8B) when the MPU 31 determines that the drill start instruction was received (when the determination result is Yes). On the other hand, here, when the MPU 31 determines that the drill start instruction has not yet been received (when the determination result is No), the MPU 31 repeats the processing in S410 until reception of the drill start instruction is detected.

The processing moves on to processing in FIG. 8B, and in 411, the MPU 31 performs processing to determine whether or not the interface device 37 of the student terminal 60 received the drill end instruction transmitted from the teacher terminal 50 that performed the processing in S119 in FIG. 5B. The MPU 31, here, moves the processing to S412 when the MPU 31 determines that the drill end instruction is received (when the determination result is Yes). On the other hand, here, when the MPU 31 determines that the drill start instruction has not yet been received (when the determination result is No), the MPU 31 moves the processing to S414.

Next, in S412, the MPU 31 performs processing to determine whether or not the interface device 37 of the student terminal 60 received a result of the above-described drill, which is transmitted from the teacher terminal 50 that performed the processing in S115 in FIG. 5B. The MPU 31, here, moves the processing to S413 when the MPU 31 determines that the result of the drill has been received (when the determination result is Yes). On the other hand, here, when the MPU 31 determines that the result of the drill has not yet been received (when the determination result is No), the MPU 31 repeats the processing in S412 until reception of the result of the drill is detected.

Next, in S413, the MPU 31 performs processing to generate a display screen of the drill result illustrated in FIG. 9 as an example, by using the result of the drill, reception of which was detected in the processing in S412, and the received question table 62, and to cause the display device 36 of the student terminal 60 to display the display screen. When this processing in S413 is terminated, the drill participation control processing is terminated.

In the example of the screen in FIG. 9, the data of "QUESTION ID", "QUESTION", "YOUR ANSWER", "CORRECT ANSWER", and "CORRECT/INCORRECT" is included in the result of the drill, reception of which was detected in the processing in S412. In addition, information in parenthesis displayed in the items "YOUR ANSWER" and "CORRECT ANSWER" in this display screen may be obtained from the choice data in the received question table 62.

Next, in S414, the MPU 31 performs processing to cause the display device 36 to display a question presenting screen to present the examination questions to a student by extracting one record including examination questions that have not been given (or that has not been displayed on the display device) from the received question table 62.

FIG. 10 is an example screen of the question presenting screen. In this example screen, each piece of data, including the question ID, the question, and the choices included in the record is displayed. In addition, in this screen, radio buttons that allow the student to select an answer are assigned to the choices and the screen further includes a "SUBMIT ANSWER" button, a "CLEAR" button, and a "DRILL COMPLETED" button. Of these buttons, the "CLEAR" button is a button to clear the selection of a choice made by the radio buttons.

Next, in S415, the MPU 31 performs processing to start a timekeeping operation of a timer, which is not illustrated, in the MPU 31 itself to measure the answering time of the examination questions, which are currently being displayed by the display device 36.

Next, in S416, the MPU 31 performs processing to determine whether or not the input device 35 of the student terminal 60 detects an input corresponding to a selection operation of a choice and a press-down operation of the "SUBMIT ANSWER" button in response to the display of the question presenting screen resulting from the processing in S414. The MPU 31, here, moves the processing to S417 when the MPU 31 determines that the input is detected (when the determination result is Yes). On the other hand, here, when the MPU 31 determines that the input has not yet been detected (when the determination result is No), the MPU 31 repeats the processing in S416 until the input is detected.

Next, in S417, the MPU 31 performs processing to terminate timekeeping of the answering time of the examination questions that are currently being displayed on the display device 36 by stopping the timer that started the timekeeping operation in the processing in S415.

Next, in S418, the MPU 31 performs processing to cause the LAN 70 to transmit information of the answers obtained by the student to the questions that are currently being displayed on the display device 36 addressed to the teacher terminal 50 by controlling the interface device 37. The information of the answers transmitted in this processing include each piece of data including the question ID of the examination questions that are currently being displayed on the display device 36, a choice selected by the student through the selection operation by using the input device 35, the student ID, input of which is detected in the processing in S403, and the answering time measured in the processing in S417. Note that the information of the answers is received by the teacher terminal 50 performing the processing in S112 in FIG. 5B.

Next, in S419, the MPU 31 performs processing to determine whether or not the input device 35 of the student terminal 60 detects an input corresponding to the press-down operation of "DRILL COMPLETION button" in response to the display of the question presenting screen that resulted from the processing in S414. The MPU 31, here, moves the processing in S420 when the MPU 31 determines that the input is detected (when the determination result is Yes). On the other hand, here, when the MPU 31 determines that the input has not yet been detected (when the determination result is No), the MPU 31 returns the processing to S411 and repeats the above-described processing in S411 and the subsequent processing.

Next, in S420, the MPU 31 performs processing to cause the LAN 70 to transmit the above-described prescribed drill completion notice and the student ID, input of which was detected in the processing in S403, addressed to the teacher terminal 50 by controlling the interface device 37. The drill completion notice and the student ID transmitted by the processing are received by the teacher terminal 50 performing the processing in S114 in FIG. 5B.

Next, in S421, the MPU 31 performs processing to determine whether or not the interface device 37 of the student terminal 60 received the above-described result of the drill, which is transmitted from the teacher terminal 50 that performed the processing in S115 in FIG. 5B. The MPU 31, here, moves the processing to S422 when the MPU 31 determines that the result of the drill was received (when the determination result is Yes). On the other hand, here, when the MPU 31 determines that the result of the drill has not yet been received (when the determination result is No), the MPU 31 repeats the processing in S421 until the reception of the result of the drill is detected.

Next, in S422, the MPU 31 performs processing to generate a display screen of a drill result illustrated in FIG. 9 as an example, by using the result of the drill, reception of which is detected in the processing in S421, and the received question table 62, and to cause the display device 36 of the student terminal 60 to display the display screen.

Next, in S423, the MPU 31 performs additional question administering control processing. This additional question administering control processing is processing to transmit answers obtained by a student to the additional examination questions transmitted from the teacher terminal 50 that performs the question adding control processing to the teacher terminal 50 and to present whether the answers are correct or incorrect to the student. Details of this additional question administering control processing are explained next.

When this additional question administering control processing is terminated, the drill participation control processing is terminated.

The processing described above is the drill participation control processing.

Figure 11A:
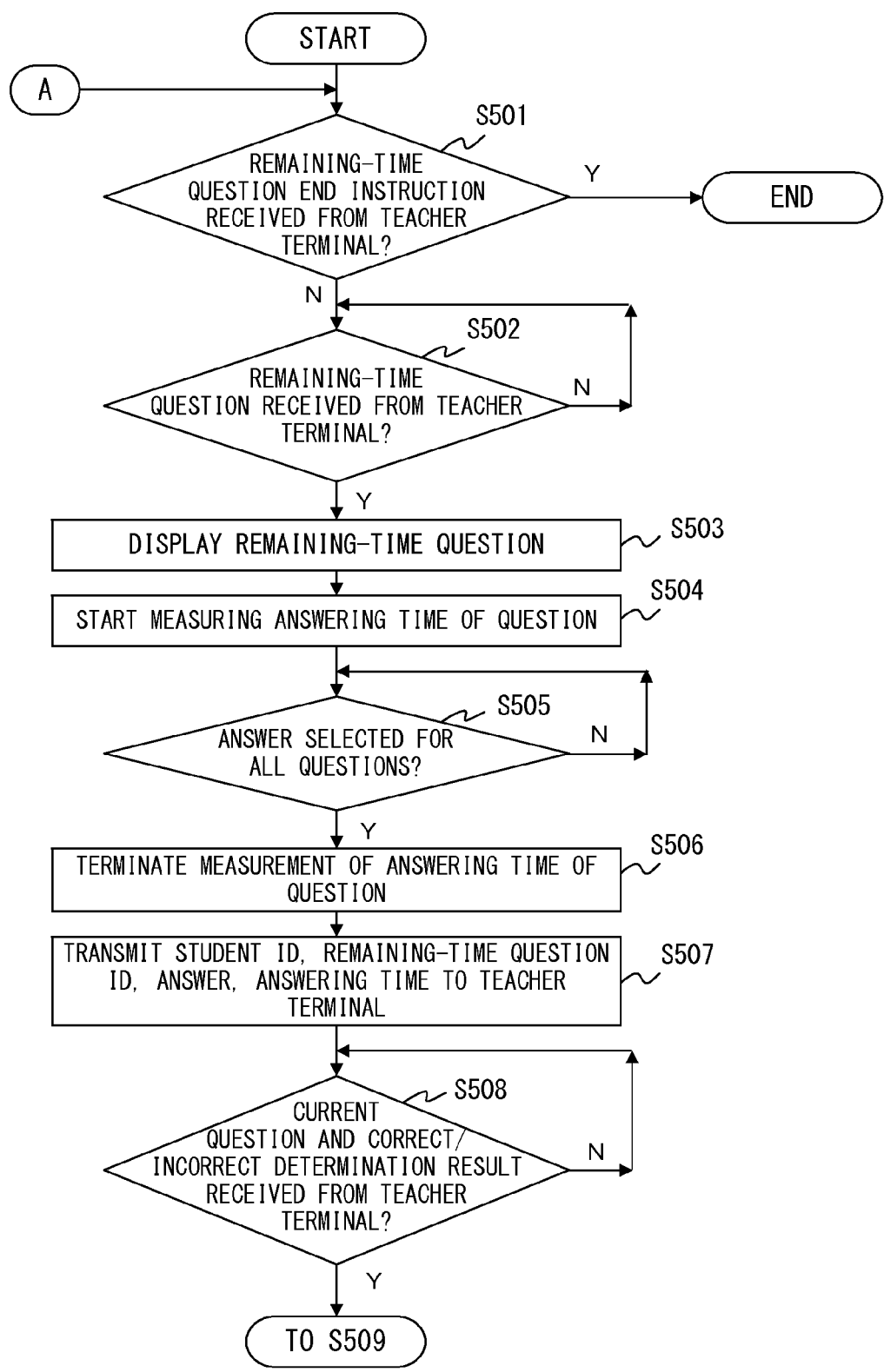
FIG. 11A is a flowchart (1) illustrating processing contents of additional question administering control processing.
Figure 11B:
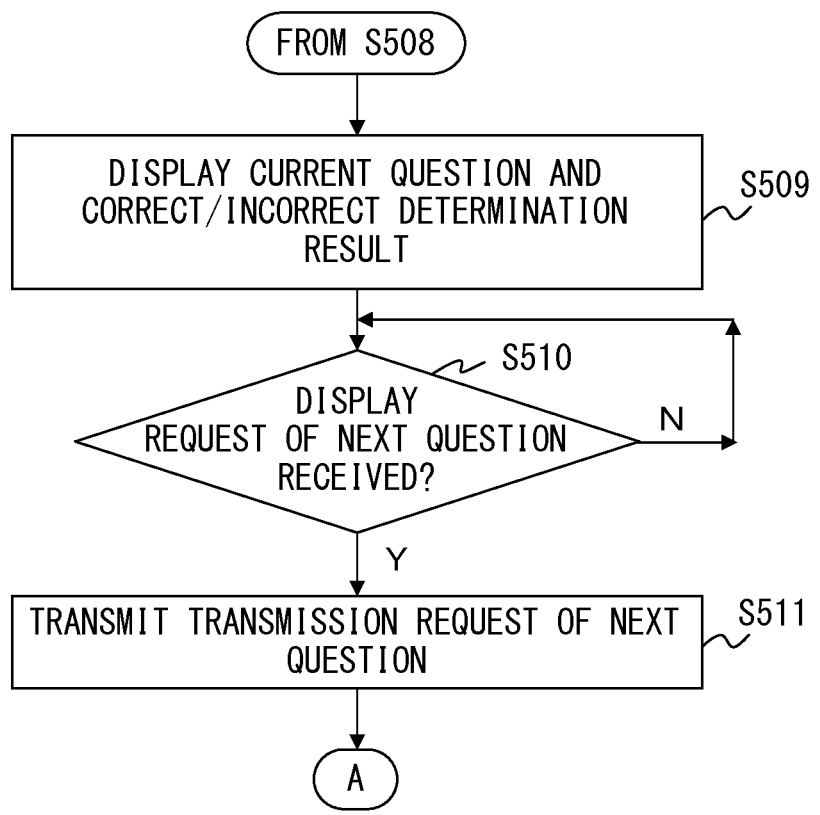
FIG. 11B is a flowchart (2) illustrating processing contents of additional question administering control processing.

Next, the additional question administering control processing, which is processing in S423 in FIG. 8B in the above-described drill participation control processing, is explained. FIG. 11A and FIG. 11B are a flowchart illustrating the processing contents of the additional question administering control processing.

In FIG. 11A, firstly, in S501, the MPU 31 performs processing to determine whether or not the interface device 37 received from the LAN 70 an instruction to stop administering the examination questions added in the remaining time, transmitted from the teacher terminal 50 that performed the processing in S217 in FIG. 6C. The MPU 31, here, immediately terminates the additional question administering control processing when the MPU 31 determines that the interface device 37 received this instruction (when the determination result is Yes). On the other hand, here, when the MPU 31 determines that the interface device 37 has not yet received this instruction (when the determination result is No), the MPU 31 moves the processing to S502.

Next, in S502, the MPU 31 performs processing to determine whether or not the interface device 37 received various pieces of data, including the question ID, the question, and the choices of the examination questions additionally administered in the remaining time, which are transmitted from the teacher terminal 50 that performed the processing in S209 in FIG. 6B. The MPU 31 moves the processing to S503 when the MPU 31 determines that the interface device 37 received these pieces of data (when the determination result is Yes). On the other hand, here, when the MPU 31 determines that the interface device 37 has not yet received these pieces of data (when the determination result is No), the MPU 31 repeats the processing in S502 until reception of these pieces of data is detected.

Next, in S503, the MPU 31 performs processing to cause the display device 36 to display an additional question presenting screen to present the additional examination questions, reception of which was detected in the processing in S502, to the student.

FIG. 12 is an example screen of the additional question presenting screen. In this example screen, each piece of data including the question ID, the question and choices, reception of which was detected in the processing in S502, is displayed. Moreover, in this screen, radio buttons that allow the student to select an answer are assigned to the data of the choices, and the screen further includes a "SUBMIT ANSWER" button, and a "CLEAR" button. Of these buttons, the "CLEAR" button is a button to clear the selection of a choice made by the radio buttons.

Next, in S504, the MPU 31 performs processing to start a timekeeping operation of a timer, which is not illustrated, in the MPU 31 itself in order to measure the answering time for the examination questions that are currently being displayed on the display device 36.

Next, in S505, the MPU 31 performs processing to determine whether or not the input device of the student terminal 60 detects an input corresponding to the selection operation of a choice and the press-down operation of the "SUBMIT ANSWER" button in response to the display of the additional question presenting screen which resulted from the processing in S503. The MPU 31, here, moves the processing to S506 when the MPU 31 determines that the input is detected (when the determination result is Yes). On the other hand, here, when the MPU 31 determines that the input has not yet been detected (when the determination result is No), the MPU 31 repeats the processing in S505 until the input is detected.

Next, in S506, the MPU 31 performs processing to terminate timekeeping of the answering time of the examination questions that are currently being displayed on the display device 36 by stopping the timer that started the timekeeping operation as a result of the processing in S504.

Next, in S507, the MPU 31 performs processing to cause the LAN 70 to transmit information of answers obtained by the student to the additional examination questions that are currently being displayed on the display device 36 addressed to the teacher terminal 50 by controlling the interface device 37. The information of the answers transmitted in this processing includes each piece of data, including the question ID of the examination questions that are currently being displayed on the display device 36, a choice selected by the student through the section operation by using the input device 35, the student ID, input of which was detected in the processing in S403 in FIG. 8A, and the answering time measured in the processing in S417. Note that the information of the answers is received by the teacher terminal 50 performing the processing in S210 in FIG. 6B.

Next, in S508, the MPU 31 performs processing to determine whether or not the interface device 37 of the student terminal 60 received a correct/incorrect determination result for the answers to the additional examination questions that are currently being displayed on the display device 36. The MPU 31, here, moves the processing to S509 when the MPU 31 determines that the correct/incorrect determination result was received (when the determination result is Yes). On the other hand, here, when the MPU 31 determines that the correct/incorrect determination result has not yet been received (when the determination result is No), the MPU 31 repeats the processing in S508 until reception of the correct/incorrect determination result is detected.

The processing moves on to processing in FIG. 11B, and in S509, the MPU 31 performs processing to generate a display screen of the answer result of the additional examination questions as illustrated in FIG. 13 as an example, by using the correct/incorrect determination result, reception of which was detected in the processing in S508, and the received question table 62, and to cause the display device 36 of the student terminal 60 to display the display screen.

In the example screen in FIG. 13, the "SUBMIT ANSWER" button and the "CLEAR" button are deleted from the additional question presenting screen illustrated as an example in FIG. 12, and instead, each piece of data including the answer obtained by the student, a correct/incorrect determination result of the answer, and the correct answer, reception of which was detected in the processing in S502, is added. Furthermore, in this example screen, a "GO TO NEXT QUESTION" button is added.

Next, in S510, the MPU 31 performs processing to determine whether or not the input device 35 of the student terminal 60 detected an input corresponding to the press-down operation of the "GO TO NEXT QUESTION" button in response to the display of the display screen of the answer result in the processing in S509. The MPU 31, here, moves the processing to S511 when the MPU 31 determines that the input was detected (when the determination result is Yes). On the other hand, here, when the MPU 31 determines that the input has not yet been detected (when the determination result is No), the MPU 31 repeats the processing in S510 until the input is detected.

Next, in S511, the MPU 31 performs processing to cause the LAN 70 to transmit a transmission request of the next question addressed to the teacher terminal 50 by controlling the interface device 37, and afterwards, the additional question administering control processing is terminated. Note that this transmission request is received by the teacher terminal 50 performing the processing in S215 in FIG. 6C.

The above-described processing is the additional question administering control processing.

As a result of each of the teacher terminal 50 and the student terminal 60 performing the above-explained various types of control processing, it is determined whether or not it is reasonable to consider that the current correct-answer percentage of a student represents the understanding of the student in a category. When it is determined that it is not reasonable to consider that the current correct-answer percentage of the student represents the understanding of the student, the examination questions pertaining to the category are additionally given to the student.

What is claimed is:

1. An examination support apparatus, comprising:
    at least one processor; and
    at least one non-transitory computer-readable storage medium coupled to the at least one processor and which stores:
        a question database configured to store a plurality of examination questions in a prescribed field in association with a plurality of administering sections to be administered;
        an answer status database configured to store
            a question identifier to identify each of the examination questions,
            an examinee identifier to identify an examinee,
            an answer status of each of the examination questions answered by the examinee in association with the administering section in which the examination questions in the prescribed field are administered, and
a date and time of administering to the examinee a plurality of examinations including examination questions of same administering section in association with the administering section; and
instructions which when executed by the at least one processor, cause the at least one processor to execute:
extract, from the question database, the examination questions associated with a current administering section from among the plurality of administering sections, and output the examination questions to an examinee terminal;
acquire an answer of the examinees to the examination questions from the examinee terminal;
determine whether the acquired answer is correct or incorrect;
calculate for the examinee a current correct-answer percentage to the examination questions in the current administering section in the prescribed field based on a result of the correct/incorrect determination;
determine a change in a correct-answer percentage for the examinee from the correct-answer percentage for the examinee of examination questions in at least one past different administering section in the prescribed field than the current administering section to the calculated current correct-answer percentage for the examinee by:
extracting, from the answer status database, at least one past correct-answer percentage of the at least one past administering section in the prescribed field at a past date and time near a date and time of the administration of the calculated current correct-answer percentage, and
determining whether a change from the extracted at least one past correct-answer percentage to the calculated current correct-answer percentage is an increase or a decrease, by a threshold; and
in response to the determined change in the correct-answer percentage for the examinee, extract based upon the question identifier in the answer status database, at least one past examination question from the at least one past administering section from the question database for output to the examinee terminal.

2. The examination support apparatus according to claim 1, wherein
in response to a time elapsed from an input of a start instruction to start an examination including the examination questions of the current administering section is less than a prescribed time indicating a time limit of the examination, the change in the correct-answer percentage is determined to extract from the question database the at least one past examination question from the at least one past administering section for the output to the examinee terminal.

3. The examination support apparatus according to claim 2, wherein
the answer status database stores an answering time from a time at which the examination question corresponding to the question identifier is displayed on the examinee terminal to a time at which an answer is input in association with the question identifier,
the at least one processor further
acquires the answering time from the examinee terminal, and
to extract from the answer status database the at least one past examination question from the at least one past administering section for the output, identifies an examination question associated with an answering time that is equal to or less than a difference between the prescribed time indicating the time limit and the elapsed time from among the examination questions in the at least one past administering section.

4. The examination support apparatus according to claim 1, wherein
in response to the change in the correct-answer percentage being the increase by the threshold, the extracted at least one past examination question is associated with the at least one past different administering section and for which an answer status of the examinee is an incorrect answer.

5. The examination support apparatus according to claim 1, wherein
in response to the change in the correct-answer percentage being the decrease by the threshold, the extracted at least one past examination question is associated with the at least one past different administering section and for which an answer status of the examinee is a correct answer.

6. The examination support apparatus according to claim 4, wherein the at least one past different administering section includes first and second past different administering sections and the determining of whether the change in the correct-answer percentage for the examinee is the increase by the threshold is based upon first and second past different administering sections.

7. The examination support apparatus according to claim 5, wherein the at least one past different administering section includes first and second past different administering sections and the determining of whether the change in the correct-answer percentage for the examinee is the decrease by the threshold is based upon first and second past different administering sections.

8. The examination support apparatus according to claim 1, wherein
the at least one past different administering section is two past different administering sections, and
the at least one processor
refers to the answer status database,
identifies a correct-answer percentage of examination questions of a first past administering section with which a date and time which is closest to a date and time to administer an examination of the current administering section of the examination questions used to calculate the correct-answer percentage is associated, and
identifies a correct-answer percentage of examination questions of a second past administering section with which a date and time which is prior to and closest to a date and time to administer an examination of the first past administering section is associated,
the change in the correct-answer percentage for the examinee is determined based upon a determination of a first change in a correct answer percentage from the correct-answer percentage of the first past administering section to the correct-answer percentage of the current administering section and a second change in a correct answer percentage from the correct-answer percentage of the second past administering section to the correct-answer percentage of the current administering section, and whether the first or second change of the correct answer percentage to the current calculated correct-answer percentage is an increase or a decrease, by the threshold, the at least one past examination question from the first or second past administering section is extracted from the question database for output to the examinee terminal, in response to the determined first or second change in the correct answer percentage for the examinee.

9. An examination support method comprising:
by a computer including
at least one processor; and
at least one non-transitory computer-readable storage medium coupled to the at least one processor and which stores:
a question database configured to store a plurality of examination questions in a prescribed field in association with a plurality of administering sections to be administered;
an answer status database configured to store
a question identifier to identify each of the examination questions,
an examinee identifier to identify an examinee,
an answer status of each of the examination questions answered by the examinee in association with the administering section in which the examination questions in the prescribed field are administered, and
a date and time of administering to the examinee a plurality of examinations including examination questions of same administering section in association with the administering section; and
instructions executable by the at least one processor,
by the at least one processor, when executing the instructions,
extracting from the question database the examination questions associated with a current administering from among the plurality of administering sections and transmitting, using an interface device, the examination questions to an examinee terminal;
determining whether an answer to the examination questions acquired from the examinee terminal is correct or incorrect;
calculating for the examinee a current correct-answer percentage of the examination questions in the current administering section in the prescribed field based on a result of the determination of whether the answer is correct or incorrect;
determining a change in a correct-answer percentage for the examinee from the correct-answer percentage for the examinee of examination questions in at least one past different administering section in the prescribed field than the current administering section to the calculated current correct-answer percentage for the examinee by:
extracting, from the answer status database, at least one past correct-answer percentage of the at least one past administering section in the prescribed field at a past date and time near a date and time of the administration of the calculated current correct-answer percentage, and
determining whether a change from the extracted at least one past correct-answer percentage to the calculated current correct-answer percentage is an increase or a decrease, by a threshold; and
in response to the determined change in the correct-answer percentage for the examinee, extracting based upon the question identifier in the answer status database, at least one past examination question from the at least one past administering section from the question database and transmitting, using the interface device, the identified examination question to the examinee terminal.

10. The examination support method according to claim 9, wherein
in response to the change in the correct-answer percentage being the increase by the threshold, the extracted at least one past examination question is associated with the at least one past administering section and for which an answer status of the examinee is an incorrect answer.

11. The examination support method according to claim 9, wherein
in response to a time elapsed from an input of a start instruction to start an examination including the examination questions of the current administering section is less than a prescribed time indicating a time limit of the examination, the change in the correct-answer percentage is determined to extract from the question database the at least one past examination question associated from the at least one past administering section for the transmitting to the examinee terminal.

12. The examination support method according to claim 9, wherein
in response to the change in the correct-answer percentage the decrease by the threshold, the extracted at least one past examination question is associated with the at least one past administering section and for which an answer status of the examinee is a correct answer.

13. The examination support method according to claim 9, wherein the answer status database stores an answering time from a time at which the examination question corresponding to the question identifier is displayed on the examinee terminal to a time at which an answer is input in association with the question identifier,
by the at least one processor, to extract from the answer status database the at least one past examination question from the at least one past administering section for the transmitting, identifying an examination question associated with an answering time that is equal to or less than a difference between the prescribed time indicating the time limit and the elapsed time from among the examination questions in the at least one past administering section.

14. A non-transitory computer-readable storage medium storing an examination support program that causes a computer to analyze a status of answer by an examinee to examination question, wherein the program causes the computer to execute processing comprising:
storing
a question database of a plurality of examination questions in a prescribed field in association with a plurality of administering sections to be administered;
an answer status database of
a question identifier to identify each of the examination questions,
an examinee identifier to identify an examinee,
an answer status of each of the examination questions answered by the examinee in association with the administering section in which the examination questions in the prescribed field are administered, and a date and time of administering to the examinee a plurality of examinations including examination questions of same administering section in association with the administering section;

extracting from the question database the examination questions associated with a current administering from among the plurality of administering sections, and transmitting the examination questions to an examinee terminal;

determining whether an answer to the examination questions acquired from the examinee terminal is correct or incorrect;

calculating for the examinee a correct-answer percentage of the examination questions in the current administering section in the prescribed field based on a result of the determination of whether the answer is correct or incorrect;

determining a change in a correct-answer percentage for the examinee from the correct-answer percentage for the examinee of examination questions in at least one past different administering section in the prescribed field than the current administering section to the calculated current correct-answer percentage for the examinee by:

extracting, from the answer status database, at least one past correct-answer percentage of the at least one past administering section in the prescribed field at a past date and time near a date and time of the administration of the calculated current correct-answer percentage, and determining whether a change from the extracted at least one past correct-answer percentage to the calculated current correct-answer percentage is an increase or a decrease, by a threshold; and in response to the determined change in the correct-answer percentage for the examinee, extracting based upon the question identifier in the answer status database, at least one past examination question from the at least one past administering section from the question database and transmitting, using the interface device, the identified examination question to the examinee terminal.

15. The non-transitory computer-readable storage medium according to claim 14, wherein in response to the change in the correct-answer percentage being the increase by the threshold, the extracted at least one past examination question is associated with the at least one past administering section and for which an answer status of the examinee is an incorrect answer.

16. The non-transitory computer-readable storage medium according to claim 14, wherein in response to a time elapsed from an input of a start instruction to start an examination including the examination questions of the current administering section is less than a prescribed time indicating a time limit of the examination, the change in the correct-answer percentage is determined to extract from the question database the at least one past examination question associated from the at least one past administering section for the transmitting to the examinee terminal.

17. The non-transitory computer-readable storage medium according to claim 14, wherein in response to the change in the correct-answer percentage the decrease by the threshold, the extracted at least one past examination question is associated with the at least one past administering section and for which an answer status of the examinee is a correct answer.

18. The non-transitory computer-readable storage medium according to claim 14, wherein the answer status database stores an answering time from a time at which the examination question corresponding to the question identifier is displayed on the examinee terminal to a time at which an answer is input in association with the question identifier, and to extract from the answer status database the at least one past examination question from the at least one past administering section for the transmitting, the processing executed by the computer comprises identifying an examination question associated with an answering time that is equal to or less than a difference between the prescribed time indicating the time limit and the elapsed time from among the examination questions in the at least one past administering section.

* * * * *